(12) United States Patent
Bertiger et al.

(10) Patent No.: US 11,418,526 B2
(45) Date of Patent: Aug. 16, 2022

(54) DETECTING ANOMALOUS NETWORK ACTIVITY

(71) Applicant: Microsoft Technology Licensing, LLC, Redmond, WA (US)

(72) Inventors: Anna Swanson Bertiger, Seattle, WA (US); Francesco Sanna Passino, London (GB); Joshua Neil, Redmond, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 16/888,762

(22) Filed: May 31, 2020

(65) Prior Publication Data
US 2021/0194907 A1 Jun. 24, 2021

Related U.S. Application Data

(60) Provisional application No. 62/952,019, filed on Dec. 20, 2019.

(51) Int. Cl.
*G06F 15/16* (2006.01)
*H04L 9/40* (2022.01)
(Continued)

(52) U.S. Cl.
CPC ......... *H04L 63/1425* (2013.01); *G06N 7/005* (2013.01); *H04L 41/142* (2013.01); *H04L 41/147* (2013.01)

(58) Field of Classification Search
CPC . H04L 63/1425; H04L 41/142; H04L 41/147; G06N 7/005
See application file for complete search history.

(56) References Cited

U.S. PATENT DOCUMENTS

| 8,260,914 B1 | 9/2012 | Ranjan |
| 9,038,180 B2 | 5/2015 | Neil |

(Continued)

FOREIGN PATENT DOCUMENTS

| EP | 3110104 A1 | 12/2016 |
| EP | 3110304 A1 | 1/2017 |
| WO | 2020191001 A1 | 9/2020 |

OTHER PUBLICATIONS

Jason Brownlee, "A Gentle Introduction to SARIMA for Time Series Forecasting in Python", Aug. 17, 2018, https://machinelearningmastery.com/sarima-for-time-series-forecasting-in-python (Year: 2018).*

(Continued)

*Primary Examiner* — Ryan J Jakovac
(74) *Attorney, Agent, or Firm* — Schwegman Lundberg & Woessner, P.A.

(57) ABSTRACT

Disclosed are systems and methods for temporal link prediction based on (generalized) random dot product graphs (RDPGs), as well as applications of such temporal link prediction to network anomaly detection. In various embodiments, starting from a time series of adjacency matrices characterizing the evolution of the network, spectral embeddings and time-series models are used to predict estimated link probabilities for a future point in time, and the predicted link probabilities are compared against observed links to identify anomalous behavior. In some embodiments, element-wise independent models are used in the prediction to take network dynamics into account at the granularity of individual nodes or edges.

20 Claims, 9 Drawing Sheets

(51) Int. Cl.
*G06N 7/00* (2006.01)
*H04L 41/142* (2022.01)
*H04L 41/147* (2022.01)

(56) References Cited

U.S. PATENT DOCUMENTS

| | | |
|---|---|---|
| 9,374,380 B2 | 6/2016 | Neil et al. |
| 9,444,836 B2 | 9/2016 | Wright et al. |
| 9,699,206 B2 | 7/2017 | Neil |
| 9,800,605 B2 | 10/2017 | Baikalov et al. |
| 9,825,979 B2 | 11/2017 | Neil et al. |
| 10,015,175 B2 | 7/2018 | Kent et al. |
| 10,015,183 B1 | 7/2018 | Neil |
| 10,122,741 B2 | 11/2018 | Neil et al. |
| 10,192,058 B1 | 1/2019 | Jalil et al. |
| 10,356,107 B1 | 7/2019 | Kent et al. |
| 10,530,799 B1 | 1/2020 | Neil et al. |
| 10,630,704 B1 | 4/2020 | Ghosh et al. |
| 10,958,667 B1 | 3/2021 | Maida et al. |
| 2015/0047026 A1 | 2/2015 | Neil et al. |
| 2015/0242637 A1 | 8/2015 | Tonn et al. |
| 2017/0228277 A1 | 8/2017 | Cheng et al. |
| 2017/0279818 A1 | 9/2017 | Milazzo et al. |
| 2018/0013777 A1 | 1/2018 | Divalentin et al. |
| 2018/0027416 A1* | 1/2018 | Bickford ............ H04L 63/1425 726/23 |
| 2018/0278641 A1 | 9/2018 | Neil |
| 2018/0322456 A1 | 11/2018 | Vesely et al. |
| 2018/0336437 A1 | 11/2018 | Cheng et al. |
| 2018/0343272 A1 | 11/2018 | Khalil et al. |
| 2018/0351971 A1 | 12/2018 | Cheng et al. |
| 2019/0132344 A1 | 5/2019 | Lem et al. |
| 2019/0182281 A1 | 6/2019 | Neil et al. |
| 2019/0364060 A1 | 11/2019 | Muddu et al. |
| 2020/0296124 A1 | 9/2020 | Pratt et al. |
| 2020/0349586 A1 | 11/2020 | Deng et al. |
| 2020/0372106 A1* | 11/2020 | Liu ....................... G06F 40/263 |
| 2020/0412755 A1* | 12/2020 | Jing ................... H04L 63/1441 |
| 2021/0049442 A1 | 2/2021 | Menon et al. |
| 2021/0112080 A1 | 4/2021 | Chen |
| 2021/0406365 A1 | 12/2021 | Neil et al. |

OTHER PUBLICATIONS

Palash Goyal, "DynGEM: Deep Embedding method for Dynamic Graphs", May 29, 2018 (Year: 2018).*
Adams, et al., Table of Contents, "Data Science for Cyber-Security", Published by World Scientific Publishing Europe Ltd, Sep. 26, 2018, 2 Pages.
Arroyo, et al., "Inference for Multiple Heterogeneous Networks with a Common Invariant Subspace", In Repository of arXiv:1906.10026v1, Jun. 24, 2019, 40 Pages.
Athreya, et al., "Statistical Inference on Random Dot Product Graphs: a Survey", In the Journal of Machine Learning Research, vol. 18, Issue 1, May 2018, 92 Paes.
Benjamin, et al., "Generalized Autoregressive Moving Average Models", In Journal of the American Statistical Association, vol. 98, Issue 461, Mar. 2003, pp. 214-223.
Brockwell, et al., Table of Contents, "Time Series: Theory and Methods", Published by Springer-Verlag, 1987, 5 pgs.
Charlin, et al., "Dynamic Poisson Factorization", In Proceedings of the 9th ACM Conference on Recommender Systems, Sep. 16, 2015, pp. 155-162.
Clauset, et al., "Hierarchical Structure and the Prediction of Missing Links in Networks", In Journal of Nature, vol. 453, Issue 7191, May 1, 2008, pp. 98-101.
Delanchy, et al., "A Statistical Interpretation of Spectral Embedding: The Generalised Random Dot Product Graph", In Repository of arXiv:1709.05506V3, Jul. 29, 2018, 25 Pages.
Dhillon, Inderjits., "Co-Clustering Documents and Words Using Bipartite Spectral Graph Partitioning", In Proceedings of the Seventh ACM SIGKDD International Conference on Knowledge Discovery and Data Mining, Aug. 26, 2001, pp. 269-274.

Dong, et al., "Clustering on Multi-Layer Graphs via Subspace Analysis on Grassmann Manifolds", In Journal of IEEE Transactions on Signal Processing, vol. 62, Issue 4, Feb. 15, 2014, pp. 905-918.
Dryden, et al., Table of Contents and Preface, "Statistical Shape Analysis: With Applications in R. Second Edition", Published by John Wiley & Sons, Sep. 6, 2016, 23 Pages.
Dunlavy, et al., "Temporal Link Prediction Using Matrix and Tensor Factorizations", In Journal of ACM Transactions on Knowledge Discovery from Data (TKDD), vol. 5, Issue 2, Article 10, Feb. 2011, 27 Pages.
Durante, et al., "Bayesian Inference and Testing of Group Differences in Brain Networks", In Journal of Bayesian Analysis, vol. 13, Issue 1, 2018, pp. 29-58.
Durante, et al., "Nonparametric Bayes Dynamic Modelling of Relational Data", In Journal of Biometrika, vol. 101, Issue 4, Oct. 8, 2014, pp. 883-898.
Durante, et al., "Nonparametric Bayes Modeling of Populations of Networks", In Journal of the American Statistical Association, vol. 112, Issue 520, Jul. 6, 2017, pp. 1516-1530.
Ginestet, et al., "Hypothesis Testing for Network Data in functional Neuroimaging", In Journal of Annals of Applied Statistics, vol. 11, Issue 2, Jun. 2017, pp. 725-750.
Gower, J.C., "Generalized Procrustes Analysis", In Journal of Psychometrika, vol. 40, Issue 1, Mar. 1975, pp. 33-51.
Hewapathirana, Isuruu., "Change Detection in Dynamic Attributed Networks", In Repository of arXiv:2001.04734v1, Jan. 14, 2020, 39 Pages.
Hoff, et al., "Latent Space Approaches to Social Network Analysis", In Journal of the American Statistical Association, vol. 97, Issue 460, Dec. 2002, pp. 1090-1098.
Holland, et al., "Stochastic Blockmodels: First Steps", In Journal of Social Networks, vol. 5, Issue 2, Jun. 1, 1983, pp. 109-137.
Hosseini, et al., "Recurrent Poisson Factorization for Temporal Recommendation", In Journal of IEEE Transactions on Knowledge and Data Engineering, vol. 32, Issue 1, Jan. 2020, pp. 121-134.
Hyndman, et al., "Automatic Time Series for Forecasting: The Forecast Package for R", In Journal of Statistical Software, vol. 27, Issue 3, Jul. 29, 2008, 22 Pages.
Ishiguro, "Dynamic Infinite Relational Model for Time-varying Relational Data Analysis", In Proceedings of 24th Annual Conference on Neural Information Processing Systems, Dec. 6, 2010, 9 Pages.
Jeske, et al., "Statistical Methods for Network Surveillance", In Journal of Applied Stochastic Models in Business and Industry, vol. 34, Issue 4, Jul. 2018, 21 Pages.
Kauppi, et al., "Predicting U.S. Recessions with Dynamic Binary Response Models", In Journal of the Review of Economics and Statistics, vol. 90, Issue 4, Nov. 2008, pp. 777-791.
Kim, et al., "Graph-aware Modeling of Brain Connectivity Networks", In Repository of arXiv:1903.02129v2, Apr. 30, 2019, 31 Pages.
Kintzel, Ulric, "Procrustes Problems in Finite Dimensional Indefinite Scalar Product Spaces", In Journal of Linear Algebra and its Applications, vol. 402, Jun. 1, 2005, 28 Pages.
Krivitsky, et al., "A Separable Model for Dynamic Networks", In Journal of the Royal Statistical Society. Series B, Statistical Methodology, vol. 76, Issue 1, Jan. 1, 2014, 21 Pages.
Levin, et al., "A Central Limit Theorem for an Omnibus Embedding of Multiple Random Graphs and Implications for Multiscale Network Inference", In Repository of arXiv:1705.09355v5, Jun. 26, 2019, 37 Pages.
Liben-Nowell, et al., "The Link-Prediction Problem for Social Networks", In Journal of the American Society for Information Science and Technology, vol. 58, Issue 7, May 2007, 23 Pages.
Lu, et al., "Link Prediction in Complex Networks: A Survey", In Journal of Physica A: Statistical Mechanics and its Applications, vol. 390, Issue 6, Mar. 15, 2011, pp. 1150-1170.
MacDonald, et al., Table of Contents, "Hidden Markov and Other Models for Discrete-valued Time Series", Published by Chapman and Hall, 1997, 5 Pages.

(56) References Cited

OTHER PUBLICATIONS

Menon, et al., "Link Prediction via Matrix Factorization", In Proceedings of Joint European Conference on Machine Learning and Knowledge Discovery in Databases, Sep. 5, 2011, pp. 437-452.
Metelli, et al., "On Bayesian New Edge Prediction and Anomaly Detection in Computer Networks", In Journal of Annals of Applied Statistics, vol. 13, Issue 4, Dec. 2019, 28 Pages.
Neil, et al., "Scan Statistics for the Online Detection of Locally Anomalous Subgraphs", In Journal of Technometrics, vol. 55, Issue 4, Nov. 1, 2013, pp. 403-414.
Nielsen, et al., "The Multiple Random Dot Product Graph Model", In Repository of arXiv:1811.12172v1, Nov. 29, 2018, 22 Pages.
Relion, et al., "Network Classification with Applications to Brain Connectomics", In Repository of arXiv:1701.08140v1, Jan. 27, 2017, 28 Pages.
Sarkar, et al., "Dynamic Social Network Analysis using Latent Space Models", In Proceedings of Neural Information Processing Systems, Dec. 5, 2005, 8 Pages.
Schein, et al., "Bayesian Poisson Tensor Factorization for Inferring Multilateral Relations from Sparse Dyadic Event Counts", In Proceedings of the 21th ACM SIGKDD International Conference on Knowledge Discovery and Data Mining, Aug. 11, 2015, pp. 1045-1054.
Schein, et al., "Bayesian Poisson Tucker Decomposition for Learning the Structure of International Relations", In Proceedings of the 33nd International Conference on Machine Learning, Jun. 19, 2016, 10 Pages.
Scheinerman, et al., "Modeling Graphs Using Dot Product Representations", In Journal of Computational Statistics, vol. 25, 2010, pp. 1-16.
Schonemann, Peterh., "A Generalized Solution of the Orthogonal Procrustes Problem", In Journal of Psychometrika, vol. 31, Issue 1, Mar. 1966, 10 Pages.
Sewell, et al., "Latent Space Models for Dynamic Networks", In Journal of the American Statistical Association, vol. 110, Issue 512, Dec. 2015, pp. 1646-1657.
Sharan, et al., "Temporal-Relational Classifiers for Prediction in Evolving Domains", In Proceedings of Eighth International Conference on Data Mining, Dec. 15, 2008, pp. 540-549.
Shiga, et al., "A Variational Bayesian Framework for Clustering with Multiple Graphs", In Journal of IEEE Transactions on Knowledge and Data Engineering, vol. 24, Issue 4, Apr. 2012, pp. 577-589.
Sussman, et al., "A Consistent Adjacency Spectral Embedding for Stochastic Blockmodel Graphs", In Repository of arXiv:1108.2228V3, Apr. 27, 2012, 21 Pages.
Tang, et al., "Clustering with Multiple Graphs", In Proceedings of Ninth IEEE International Conference on Data Mining, Dec. 6, 2009, pp. 1016-1021.
Tang, et al., "Connectome Smoothing via Low-Rank Approximations", In Journal of IEEE Transactions on Medical Imaging, vol. 38, Issue 6, Jun. 2019, pp. 1446-1456.
Turcotte, et al., "Chapter 1: Unified Host and Network Data Set", In Book of Data Science for Cyber-Security, 2018, 22 Pages.
Wang, et al., "Joint Embedding of Graphs", In Journal of IEEE Transactions on Pattern Analysis and Machine Intelligence, Oct. 31, 2019, 13 Pages.
Xing, et al., "A State-Space Mixed Membership Blockmodel for Dynamic Network Tomography", In Journal of Annals of Applied Statistics, vol. 4, Issue 2, Jun. 2010, pp. 535-566.
Xu, et al., "Dynamic Stochastic Blockmodels for Time-Evolving Social Networks", In IEEE Journal of Selected Topics in Signal Processing, vol. 8, Issue 4, Aug. 2014, pp. 552-562.
Young, et al., "Random Dot Product Graph Models for Social Networks", In Proceedings of International Workshop on Algorithms and Models for the Web-Graph, Dec. 11, 2007, pp. 138-149.
Gallagher, et al., "Spectral Clustering in the Weighted Stochastic Block Model", In Journal of Computing Research Repository, Oct. 12, 2019, 12 Pages.
Goyal, et al., "DynGEM: Deep Embedding Method for Dynamic Graphs", In Journal of Computing Research Repository, May 29, 2018, 8 Pages.
"International Search Report and the Written Opinion Issued in PCT Application No. PCT/US20/061989", dated Jan. 20, 2021, 12 Pages.
"Application as Filed in U.S. Appl. No. 17/109,416", filed Dec. 2, 2020, 67 Pages.
Akoglu, et al., "Graph-Based Anomaly Detection and Description: A Survey", In Repository of arXiv:1404.4679v2, Apr. 28, 2014, pp. 1-68.
Boden, et al., "Mining Coherent Subgraphs in Multi-Layer Graphs with Edge Labels", In Proceedings of the 18th ACM SIGKDD International Conference on Knowledge Discovery and Data Mining, Aug. 12, 2012, pp. 1258-1266.
Chaudhary, et al., "Anomaly Detection Using Graph Neural Networks", In Proceedings of International Conference on Machine Learning, Big Data, Cloud and Parallel Computing (COMITCon), Feb. 14, 2019, pp. 346-350.
Cheema, et al., "Network Security Using Graph Theory", In International Journal of Innovation in Engineering and Technology, vol. 2, Issue 3, Jun. 2013, pp. 131-138.
Chickering, et al., "Selective Greedy Equivalence Search: Finding Optimal Bayesian Networks Using a Polynomial Number of Score Evaluations", In Proceedings of the Thirty-First Conference on Uncertainty in Artificial Intelligence (UAI), Jun. 2015, 16 Pages.
Deng, et al., "Graph Neural Network-Based Anomaly Detection in Multivariate Time Series", In Proceedings of the AAAI Conference on Artificial Intelligence, vol. 35, No. 5, Feb. 2, 2021, 9 Pages.
Gu, et al., "Statistical Analysis of Nearest Neighbor Methods for Anomaly Detection", In Proceedings of 33rd Conference on Neural Information Processing Systems (NeurIPS), Dec. 8, 2019, 11 Pages.
Hasan, et al., "Towards Optimal Cyber Defense Remediation in Energy Delivery Systems", In Proceedings of Global Communications Conference, Dec. 9, 2019, 7 Pages.
Idé, et al., "Eigenspace-Based Anomaly Detection in Computer Systems", In Proceedings of the Tenth ACM SIGKDD International Conference on Knowledge Discovery and Data Mining, Aug. 22, 2004, pp. 440-449.
Juszczyszyn, et al., "Motif-Based Attack Detection in Network Communication Graphs", In Proceedings of IFIP International Conference on Communications and Multimedia Security, Oct. 19, 2019, 8 Pages.
Liu, et al., "Fraud Detection Using Graph Topology and Temporal Spikes", In Proceedings of the 13th International Workshop on Mining and Learning with Graphs (MLG), Aug. 14, 2017, 8 Pages.
Mookiah, et al., "Detecting Suspicious Behavior Using a Graph-Based Approach", In Proceedings of IEEE Conference on Visual Analytics Science and Technology (VAST), Nov. 9, 2014, pp. 357-358.
Mussmann, et al., "Graph Search Algorithms", Retrieved From: https://web.archive.org/web/20190612005845/https://cs.stanford.edu/people/abisee/gs.pdf, Jun. 12, 2019, 48 Pages.
Passing, et al., "Latent Factor Representations of Dynamic Networks with Applications in Cyber-Security", In Thesis of Imperial College London, Oct. 2020, 206 Pages.
Passing, et al., "Link Prediction in Dynamic Networks Using Random Dot Product Graphs", In Journal of Data Mining and Knowledge Discovery, vol. 35, No. 5, Aug. 5, 2021, pp. 2168-2199.
"International Search Report & Written Opinion issued in PCT Application No. PCT/US2021/033956", dated Aug. 18, 2021, 26 Pages.
Phillips, et al., "A Graph-Based System for Network-Vulnerability Analysis", In Proceedings of the Workshop on New Security Paradigms, Sep. 22, 1998, pp. 71-79.
Rohe, et al., "Co-Clustering Directed Graphs to Discover Asymmetries and Directional Communities", In Proceedings of the National Academy of Sciences, vol. 113, No. 45, Nov. 8, 2016, pp. 12679-12684.
"Non Final Office Action Issued in U.S. Appl. No. 16/917,318", dated Mar. 30, 2022, 10 Pages.

* cited by examiner

US 11,418,526 B2

DETECTING ANOMALOUS NETWORK ACTIVITY

PRIORITY CLAIM

This patent application claims the benefit of priority, under 35 U.S.C. Section § 119 to U.S. Provisional Patent Application Ser. No. 62/952,019, entitled "DETECTING ANOMALOUS NETWORK ACTIVITY," filed on Dec. 20, 2019, which is hereby incorporated by reference herein in its entirety.

BACKGROUND

Link prediction is defined as the task of predicting the presence of an edge between two nodes in a network, based on latent characteristics of edges and nodes. The problem of link prediction has been widely studied in the literature and has relevant applications in a variety of different fields. The ability to correctly predict and associate anomaly scores with the connections in a computer or telecommunication network, for example, is useful in cyber defense of enterprises and other organizations. In cyber settings, adversaries may introduce changes in the structure of the network in the course of their attack. Therefore, predicting links in order to identify significant deviations from expected behavior could lead to the detection of an otherwise extremely damaging breach to an enterprise. Such deviations may, in particular, include new links representing previously unobserved connections, which are often associated with malicious activity.

Computer networks within organizations tend to be very large and exhibit complex time-dependent characteristics, requiring computationally efficient methods that take network dynamics into account to detect and assess anomalous network behavior.

DETAILED DESCRIPTION

Figure 1:
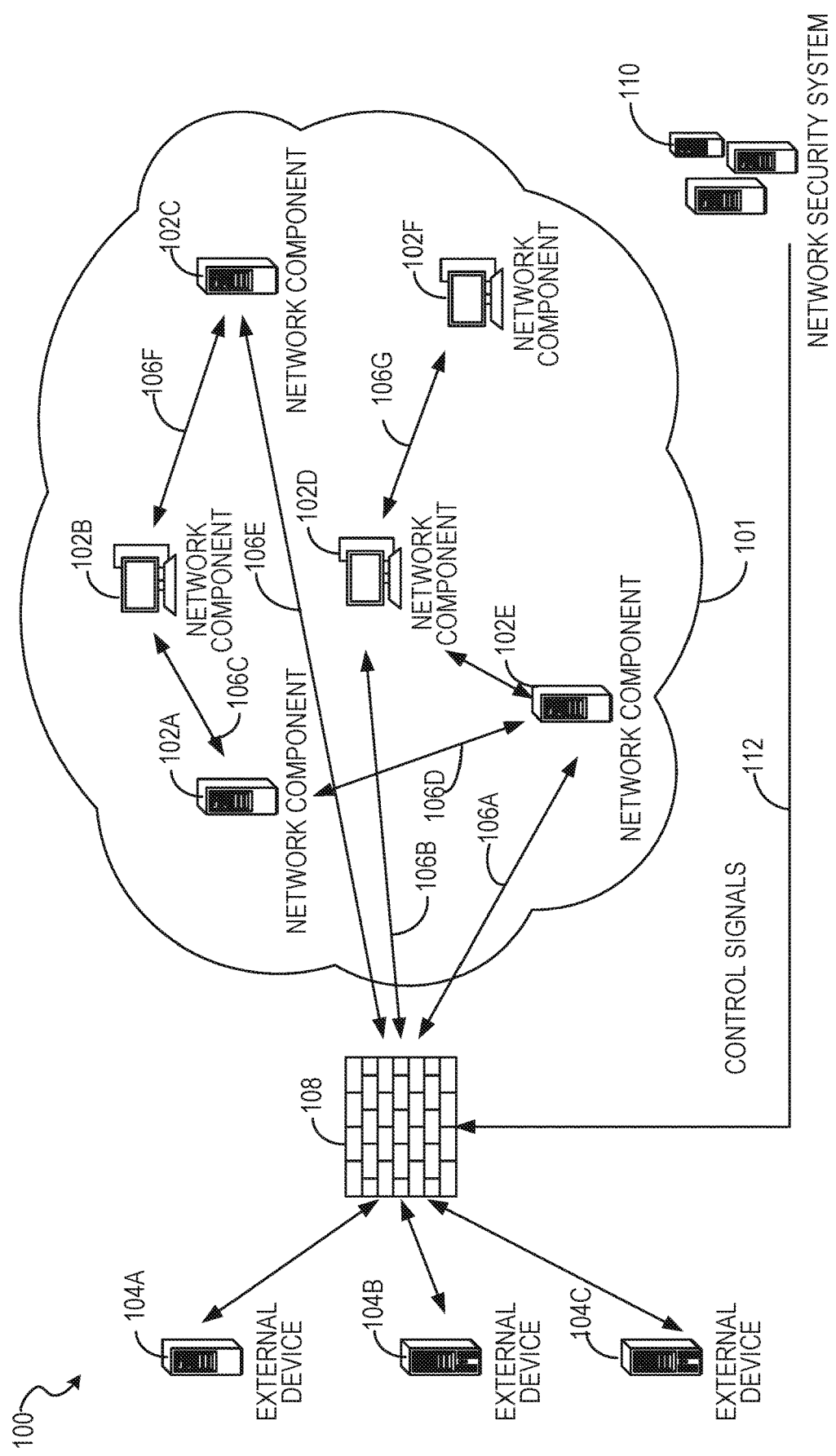
FIG. 1 is an overview diagram of an enterprise network within a communication ecosystem, in accordance with one or more of the disclosed embodiments.

This disclosure provides various processes for temporal link prediction based on random dot product graphs (RDPGs) or generalized random dot product graphs (GRDPGs), or related concepts, and describes applications of such temporal link prediction to network anomaly detection. While the disclosed embodiments for link prediction are generally applicable to any kind of network of nodes and edges, regardless of what those nodes and edges represent, various embodiments relate, specifically, to detecting anomalous network traffic in a computer or other communications network, e.g., of an enterprise. For this purpose, communication data indicating network communication of network components of an enterprise network is collected. Network communication can occur between two devices within an enterprise network or, alternatively, between a device within the enterprise network and another, external device. The term "network communication" is herein understood broadly to refer to any kind of messages or packets sent between devices across a network, whether they convey human-generated messages (e.g., email), communicate user input (e.g., during user login to a network), are program-generated (e.g., API calls) etc. The communication data can be represented as a network graph, with nodes of the network graph representing devices or network components participating in the communication, and edges of the graph representing communication between the network components. In some embodiments, the network graph is a directed graph, with edges representing traffic between devices in one direction. The temporal behavior of the network is tracked with multiple network graphs providing "snapshots" of network communication occurring within different time periods. Collectively, these multiple network graphs can also be viewed as a "time-dependent network graph." The time-dependent network graph represents a time series of recorded network activity involving network devices (e.g., computers), from which subsequent network activity can be predicted. A comparison of the predicted network activity with the actually observed subsequent network activity allows for anomaly detection.

Link prediction in accordance with the disclosed embodiments involves generating a time series of adjacency matrices representing the time-dependent network graph during a first time period (which includes a time series of first time intervals), and computing, from that time series of adjacency matrices, estimated link probabilities for connections in the network graph during a second time period (which may include one or more second time intervals). A link probability (herein also "link score") indicates, for any given pair of nodes, the probability that these two nodes are connected (e.g., representing, for a given pair of network devices, the probability that the devices communicate during a specified time interval).

An adjacency matrix is a binary matrix, with rows and columns corresponding to the nodes in the graph, whose entries are equal to 1 only in matrix cells whose associated two nodes (i.e., one node corresponding to the row and one node corresponding to the column of the cell) are connected. The binary representation of network connections in the form of an adjacency matrix can be converted into a probabilistic representation. For a symmetric adjacency matrix representing an undirected graph, this representation may take the form of a GRDPG. In a GRDPG, the nodes correspond to "latent positions" within a "latent vector space" (as the terms are understood in the art). The latent positions can be computed by a suitable spectral embedding of the adjacency matrix, such as, e.g., adjacency spectral embedding (ASE) or Laplacian spectral embedding (LSE). To spectrally embed directed graphs, each node may be represented by two latent positions, corresponding to the node as an origin or destination of a network link (e.g., a network device acting as transmitter or receiver of network communication), in what amounts to an extension of GRDPGs. The vectors within the latent space that represent the latent positions, as computed by spectrally embedding the adjacency matrix, are herein also referred to individually as "spectral-embedding vectors," and collectively simply as the "spectral embedding" of the adjacency matrix (which in itself is a matrix).

The GRDPG (or its extension for directed graphs) allows computing link probabilities between pairs of nodes by measuring the mutual proximity of the latent positions of these nodes, e.g., using an inner product (also "dot product") (or generalized inner product) of the respective vectors in the latent vector space. In this manner, an individual binary adjacency matrix can be converted into a non-binary, probabilistic "link score matrix." To predict link probabilities during (a time interval within) a second time period from a time series of adjacency matrices representing the network links during a first time period, a joint GRDPG for the second time period may be computed by aggregating, in some manner, over the information from the time series of adjacency matrices associated with the first time period. This aggregation can be achieved in various ways.

In one approach, the adjacency matrices associated with the first time period are averaged, e.g., in a weighted manner. In a weighted average, the weighting coefficients may be applied to the adjacency matrices as a whole, or to individual matrix elements for edge-specific weighting. If the latter, a time series of weighting matrices can be computed from the time series of adjacency matrices associated with the first time interval, e.g., using an autoregressive integrated moving average (ARIMA) model or seasonal ARIMA (SARIMA) model. In any case, the average adjacency matrix computed from the individual adjacency matrices associated with the first time period is spectrally embedded to generate a spectral-embedding vector for each node that represents an estimate of the latent position of the node during the second time period. Estimated link probabilities associated with the second time period can then be computed for pairs of nodes from the associated spectral-embedding vectors, e.g., by forming the (generalized) inner product. Collectively, the estimated link probabilities form a link score matrix representing, probabilistically, the network graph during the second time period.

In an alternative approach, the adjacency matrices associated with the first time period are first processed individually, by spectral embedding followed by computing the inner products of (or otherwise scoring) pairs of spectral-embedding vectors, to compute a separate link score matrix for each time interval within the first time period. The link score matrices associated with the first time period are then averaged, e.g., in a weighted manner. In a weighted average, the weighting coefficients may be applied to the link score matrices as a whole, or to individual matrix elements for edge-specific weighting. If the latter, a time-series of weighting matrices can be computed from the time series of link score matrices associated with the first time interval, e.g., using an ARIMA or SARIMA model. The average link score matrix represents the estimated link probabilities associated with pairs of nodes within the network graph.

In a third approach, the adjacency matrices associated with the first time period are each individually spectrally embedded, resulting in a time series of spectral embeddings associated with the first time intervals, each such spectral embedding including spectral-embedding vectors (representing a latent position) for all of the nodes within the network. The spectral-embedding vectors associated with any given node are then averaged across time intervals, or otherwise processed, to compute a predicted spectral embedding vector associated with that node for the second time period. Since spectral embeddings are unique only up to (indefinite) orthogonal transformations), and their constituent spectral-embedding vectors, thus, are not directly comparable across different embeddings associated with different time intervals, computing predicted spectral-embedding vectors generally involves first aligning the spectral-embedding vectors across embeddings. The alignment is achieved, in some embodiments, by (generalized) Procrustes transformation. Following Procrustes (or other) alignment, the predicted spectral embedding vector for a given node can be computed, e.g., by simple averaging or using an ARIMA or SARIMA model. From the predicted spectral embedding vectors, estimated link probabilities can then be computed by forming the inner products or otherwise scoring pairs of predicted embedding vectors.

Yet another approach employs a common subspace independent-edge (COSIE) network model. In a COSIE network, the latent positions are assumed to be common across the multiple snapshots of the network graph, but the link probabilities are scaled by a time-varying weighting matrix, herein the "COSIE correction matrix" (or simply "COSIE matrix"). Thus, the time series of adjacency matrices associated with the first time period is processed, in this approach, to compute a joint spectral embedding representing the latent positions of the network nodes as well as a time series of COSIE correction matrices. From the time series of COSIE correction matrices for the first time period, a COSIE correction matrix for the second time period can be predicted. In some embodiments, each element of the predicted COSIE correction matrix is based on an independent model of the respective elements of the time series of COSIE correction matrices; in this manner, edge-specific dynamics of the time-dependent network graph are taken into account. The predicted COSIE correction matrix for the second time period can then be left- and right-multiplied with the spectral embedding to compute the link score matrix of estimated link probabilities.

Regardless of the approach employed to compute the link score matrix associated with a second time interval within a second time period, the estimated link probabilities of the link score matrix can be compared against the actually observed network links during the second time interval, as reflected in an adjacency matrix capturing the network during the second time interval, to detect anomalies. In some embodiments, the comparison is based on an anomaly criterion, such as a specified probability threshold. For example, links in the observed network (represented by 1's in the adjacency matrix for the second time interval) may be deemed anomalous if the corresponding estimated link probabilities fall below a certain threshold. Similarly, the absence of a link in the observed network (represented by a 0 in the adjacency matrix for the second time interval) may be considered an anomalous disruption if the corresponding estimated link probability exceeds a certain threshold. Instead of comparing scores at the level of links, it is also possible to score nodes, aggregating for each node across its incoming and outgoing links, and comparing the aggregated node score against a specified threshold.

In some embodiments, the second time interval occurs after the time series of first time intervals from which the estimated link probabilities are predicted. Thus, the comparison may be between a prediction made based on a historical profile of network activity, and the actual network activity observed, e.g., during a current or recent time interval. However, it is also possible, in principle, for the second time interval to precede the first period of time, allowing for anomaly detection in the past based on a "prediction" backwards in time. Further, in some embodiments, predictions are made for multiple second time intervals within a second time period by extrapolating by varying lengths of time beyond the first time period (e.g., using different weighting factors in the computations for different second time intervals). In general, the network behavior predicted based on observations during a time series of first time intervals within a first time period is compared against observed network behavior during a second time interval outside the first time period; in other words, the second time interval does typically not overlap with the first time period underlying the prediction.

Once anomalous network behavior has been detected, nodes associated with the anomaly, and the network components they represent, can be identified. In some embodiments, a subset of the nodes is represented in a subgraph and provided as output. For example, a subset of network devices within an enterprise network that engage in anomalous communication may be displayed as a subgraph to a network administrator. Further, to thwart cyberattacks, certain risk-mitigating measures may be taken. For instance, some embodiments automate modification of an access control policy for one or more of the suspect network components. Network components identified as suspect may be subjected to a more restrictive network access policy than those devices not identified as suspect, e.g., by preventing them from communicating with devices outside the enterprise network or from all network communication with any devices. Alternatively, a less drastic mitigation effort may involve enhancing transaction or communication logging to enable subsequent analysis, should the anomaly turn out to, indeed, be malicious. As another example, in situations where anomalous behavior is found to be associated with a specific user account, raising suspicion that the account may have been hacked, the user may be notified, the account be suspended, or credentials revoked entirely. Note that anomalous network behavior need not necessarily result from malicious activity. In cases of benign, but unusual network behavior, responses may also include, e.g., allocating more computational resources to network components experiencing high traffic, stopping mistaken runaway jobs, etc.

The use of methods associated with GRDPGs, as described herein, can provide for a more efficient prediction and a better understanding of the temporal evolution of a network, as compared with other link prediction methods. As a result, GRDPG-based methods may allow larger volumes and/or more frequent time samples of network data to be considered. In addition, applying edge-specific weights and/or otherwise modeling link probabilities for different pairs of nodes independently provides greater flexibility in capturing complex network dynamics. Computational efficiency and edge-specific modeling of complex network dynamics, in turn, can provide for higher accuracy and reduced latency in anomaly detection.

The foregoing will be more readily understood from the following more detailed description of various embodiments, in particular, when taken in conjunction with the drawings.

FIG. 1 is an overview diagram of an enterprise network within a communication ecosystem 100, in accordance with one or more of the disclosed embodiments. As shown, the enterprise network 101 includes a plurality of network components 102A-F. FIG. 1 also shows devices 104A-C external to the enterprise network 101, but part of the larger communication ecosystem 100. Devices 102A-F within the enterprise network 101 and external devices 104A-C outside the enterprise network 101 can communicate with each other. Examples of such communication are illustrated in FIG. 1 as arrows 106A-G (not all arrows are labeled to preserve figure clarity).

Access to the enterprise network 101 is controlled by a firewall 108. FIG. 1 also shows a network security system 110. The network security system 110 collects information on the communication between network components 102A-F and/or external devices 104A-C represented by the arrows 106A-G. s discussed in more detail below, based on information indicating the communications, the disclosed embodiments provided for improved methods of detecting anomalous communication between network components 102A-F and/or external devices 104A-C. In some embodiments, the network security system 110 sends one or more control signals 112 to the firewall 108. The control signals 112 configure one or more network access policies for one or more of the devices 102A-G.

Figure 2:
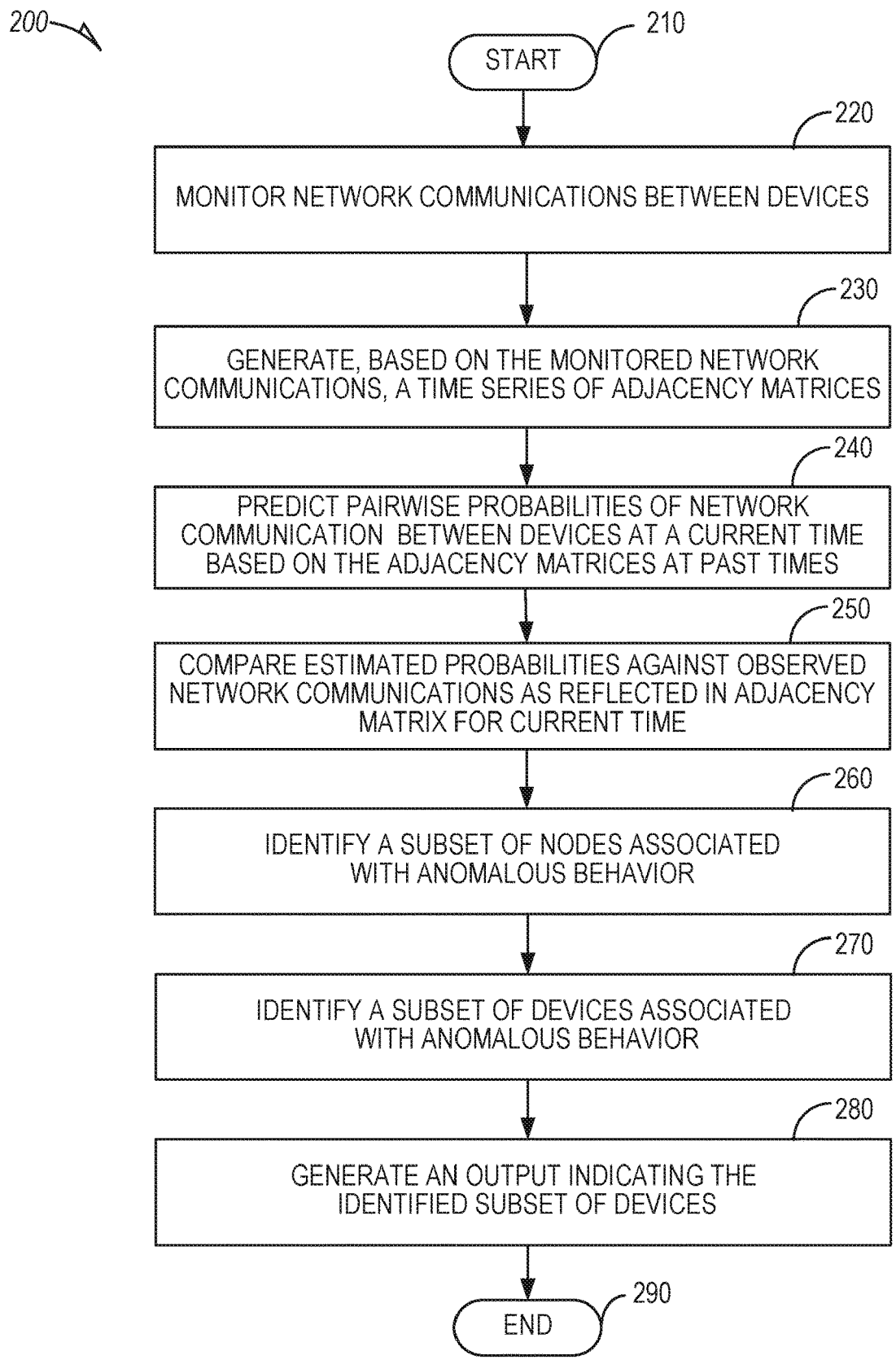
FIG. 2 is a flowchart of a process for anomaly detection in a communications network, in accordance with one or more of the disclosed embodiments.

FIG. 2 is a flowchart of a process 200 for anomaly detection in a communications network, in accordance with one or more of the disclosed embodiments. The process 200 may be employed, for instance, to detect anomalous network activity on an enterprise network 101, which may include both anomalous communications between pairs of devices within the enterprise network 101 (e.g., any one of devices 102A-F of FIG. 1) as well as anomalous communications of a device within the enterprise network 101 with a device outside the enterprise network (e.g. any of external devices 104a-c of FIG. 1). In some embodiments, one or more of the functions of process 200 are performed by hardware processing circuitry (e.g., with reference to FIG. 8, hardware processor 802). In some embodiments, instructions (e.g., 824) stored in a memory (e.g., 804, 806) configure the hardware processing circuitry (802) to perform one or more of the functions discussed below. One or more of the functions of process 200 may be performed by the security system 110 discussed above with respect to FIG. 1.

Upon start of the process 200 at 210, network activity within the communications network is monitored in operation 220. The monitored activity includes, in particular, network communications between pairs of devices within the communications network. Conceptually, these communications can be represented as a time-dependent network graph in which nodes represent the devices within the communications network (e.g., the devices 102A-F within an enterprise network 101 and any external devices 104a-c with which the devices of the enterprise network 101 communicate) and edges represent communication between pairs of the devices.

In operation 230, a plurality of adjacency matrices corresponding to the time-dependent network graph is generated based on the monitored network communications. The rows and columns of each adjacency matrix correspond to the nodes (and, thus, the devices within the communications network), and the matrix entries indicate for any two nodes whether they are connected (a connection corresponding to an edge in the network graph). Each of the adjacency matrices is generated based on network communications during a time interval specific to the respective adjacency matrix, and represents a snapshot of the network graph during that time interval. For example, in some embodiments, each adjacency matrix represents network communications occurring within a 24-hour time interval. In other embodiments, each adjacency matrix represents communications occurring within 30 minutes, one hour, two hours, five hours, 12 hours, or any elapsed time interval. Whenever communication takes place between two devices during one of a series of time intervals, the entry in the associated row and column of the adjacency matrix representing communications within that time interval may be set to 1. All matrix entries corresponding to pairs of devices that do not communicate with each other during that time interval may be set to 0. Thus, the plurality of adjacency matrices represent a time series of network activity within the enterprise network. In various embodiments, the time series includes adjacency matrices for a series of first (e.g., past) time intervals and a second (e.g., current) time interval.

In operation 240, link scores corresponding to pairwise probabilities of network communication between devices during the second time interval are estimated based on the time series of adjacency matrices for the first time intervals. Thus, network communication at a current time, for instance, can be predicted from network communication at past times (as reflected in links between nodes of the network graph). Various processes for such link prediction are described below with reference to FIGS. 3-6.

In operation 250, the estimated probabilities, which reflect the likelihood that any two devices communicate during the second time interval, are then compared against the actual, observed network communications reflected in the adjacency matrix for the second time interval. The comparison is performed according to some criterion defining anomalous network behavior. Anomalous behavior may, for example, include observed network communication between two devices whose estimated probability of communication is very low (e.g., less than 1% or less than 0.1%), or the absence of communication between two devices whose estimated probability of communication is very high (e.g., 90% or 99%). More complex definitions of anomalous behavior that involve groups of more than two devices are also possible. For example, if the estimated likelihood of communications between a certain group of devices are relatively low, the network behavior of the group in its entirety may be deemed anomalous if more than a specified fraction of pairs of devices within the group communicate with one another.

In operation 260, a subset of (one or more) nodes associated with anomalous behavior is identified based on the comparison between the estimated probabilities computed from the adjacency matrices for the series of first time intervals and the links in the network graph represented by the adjacency matrix of the second time interval. In identifying the anomalous nodes, link scores associated with a given node corresponding to a single device may be aggregated across multiple links originating from or directed to that node; in some embodiments, the aggregation of the scores is accomplished via Fisher scoring. The aggregated scores of each node are then compared against a threshold specified as indicative of anomalous network communication. Alternatively, the comparison may take place at the link level, and nodes associated with any links deemed anomalous, based on their link scores as compared with a specified threshold, inherit the classification as anomalous.

In operation 270, the identified subset of nodes is used to determine a corresponding subset of the network devices. In some embodiments, operation 270 generates a subgraph representing network communication occurring between the subset of devices.

In operation 280, an output indicating or based on the identified subset of devices is generated. The output may take the form of, e.g., a written report, visual display of the subgraph, or other human-readable output indicating the subset of devices engaged in anomalous network activity, e.g., shown on a computer screen or other electronic display or communicated via a message such as email or text. A network administrator may review such output and take appropriate remediating action. Alternatively or additionally, operation 280 may include an automated action, such as an action remediating a potential cyber threat or responding to benign anomalous network behavior. The remediating action taken in response to an anomaly indicative of a cyberattack may include, for instance, modifying one or more access control policies for devices included in the identified subset of devices. For example, in some embodiments, one or more firewalls or other access control devices are configured by operation 280, e.g., via a command or update to a policy directory, to isolate parts of the network by precluding or restricting network communication by any one or more of the devices of the subset of devices classified as anomalous. Other remediating actions may include triggering an enhanced monitoring and logging mode in which more detail about network communications is stored for later analysis, and revoking user login credentials or suspending user accounts in cases where anomalous activity is linked to one or a few accounts that may have been hacked (and/or informing the respective user(s) of the suspicion via a separate channel, such as a text to a mobile device number on file). In response to benign anomalies, such as, e.g., abnormally high levels of communications with a subset of network devices, appropriate responses may include adding computational resources to those devices or rerouting communications, analyzing the communications further to detect runaway jobs and abort them, or logging data associated with the communications (e.g., search requests, downloaded documents, etc.) to facilitate later analysis of network usage patterns and/or correlations between unusual activity and certain events, etc. Other examples of output generated based on the identified subset of devices may occur to those of ordinary skill in the art. Following the output in operation 280, the process 200 is complete at 290.

In the disclosed embodiments, link prediction, as used to compute the estimated probabilities of network communication in operation 240, is performed using techniques based on GRDPGs. To introduce this mathematical framework, consider a sequence of network graphs $\mathbb{G}_t=(V, E_t)$ representing snapshots of the dynamic network observed during time intervals ending at discrete time points $t=1, \ldots, T$. The set V represents the set of nodes, which is invariant over time. On the other hand, the set $E_t$ represents the time-dependent edge set, where $(i,j) \in E_t$, $i,j \in V$, if i is connected to j at least once during the time period $(t-1, t]$. Each snapshot of the graph can be characterized by the adjacency matrix $A_t \in \{0,1\}^{n \times n}$, where n is the number of node in V, and $A_{ijt}=1$ if a link between the nodes i and j exists in $(t-1, t]$, and $A_{ijt}=0$ otherwise. The graph is said to be undirected if $A_t$ is symmetric, reflecting that $(i,j) \in E_t$ implies $(j, i) \in E_t$; otherwise, the graph is said to be directed. It is assumed, for purposes of some embodiments, that $A_t$ is hollow, meaning that the graph has no self-edges. While the following description refers to graphs for a single set of nodes V, the illustrated concepts and principles can similarly be applied to bipartite graphs $\mathbb{G}_t=(V_1, V_2, E_t)$ for two node sets $V_1$ and $V_2$, as represented by a rectangular adjacency matrix $A_t \in \{0, 1\}^{n_1 \times n_2}$, where $n_1$ and $n_2$ are the numbers of nodes in $V_1$ and $V_2$, respectively, and $A_{ijt}=1$ if node $i \in V_1$ connects to $j \in V_2$ in $(t-1, t]$; those of ordinary skill in the art will know how to adapt the techniques described below to the more general case of bipartite graphs.

In RDPGs, the nodes i of the network graph are given respective latent positions $x_i$ in a d-dimensional latent space $\mathbb{X}$ such that $x^T x' \in [0,1] \forall x, x' \in \mathbb{X}$ (where T indicates the transpose). The edges between pairs of nodes are generated independently, with probability of a link between nodes i and j obtained through the inner product $\langle \cdot, \cdot \rangle$ on $\mathbb{X} \times \mathbb{X}$: $\mathbb{P}(A_{ij}=1)=x_i^T x_j$. In matrix notation, the latent positions can be grouped in an n×d matrix $X=[x_1, \ldots, x_n]^T \in \mathbb{X}^n$ and the expectation values of a single adjacency matrix A can be expressed as $\mathbb{E}(A) = XX^T$. Thus, RDPGs allow computing a probabilistic representation $\mathbb{E}(A)$ of the network links based on the binary adjacency matrix A.

In a GRDPG, a generalized version of the inner product is used to determine link probabilities from latent positions of nodes within an undirected graph. Let $d_+$ and $d_-$ be non-negative integers such that $d=d_+ + d_-$, and let $\mathbb{X} \subseteq \mathbb{R}^d$ be a latent space such that $\forall x, x' \in \mathbb{X}, 0 \leq x^T I(d_+, d_-) x' \leq 1$, where $$I(p, q) = \text{diag}\bigg(\underbrace{1, \ldots, 1}_{p}, \underbrace{-1, \ldots, -1}_{q}\bigg).$$

Further, let F be a probability measure on $\mathbb{X}$, $X=[x_1, \ldots, x_n]^T \in \mathbb{X}^n$ be a set of n latent positions in $\mathbb{X}$, and $A \in \{0,1\}^{n \times n}$ be a symmetric matrix. Then the set (A, X) forms a GRDPG for F, $d_+$, and $d_-$, i.e., $(A, X) \sim \text{GRDPG}_{d_+, d_-}(F)$, if $x_1, \ldots, x_n$ are independently identically distributed according to F and for $i<j$:

$$\mathbb{P}(A_{ij}=1) = x_i^T I(d_+, d_-) x_j.$$

For a given symmetric adjacency matrix A, consistent estimates of the latent positions in a GRDPG can be obtained by a suitable spectral embedding technique, such as adjacency spectral embedding (ASE) or Laplacian spectral embedding. For the ASE of a symmetric adjacency matrix A, consider the spectral decomposition $$A = \hat{\Gamma} \hat{\Lambda} \hat{\Gamma}^T + \hat{\Gamma}_\perp \hat{\Lambda}_\perp \hat{\Gamma}_\perp^T,$$

where $\hat{\Lambda}$ is a d×d diagonal matrix ($d \in \{1, \ldots, n\}$), containing the top d eigenvalues in order of decreasing magnitude, $\hat{\Gamma}$ is an n×d matrix containing the corresponding orthonormal eigenvectors, and the matrices $\hat{\Lambda}_\perp$ and $\hat{\Gamma}_\perp$ contain the remaining n−d eigenvalues and eigenvectors. The ASE $\hat{X}=[\hat{x}_1, \ldots, \hat{x}_n]^T$ of A in $\mathbb{R}^d$ is:

$$\hat{X} = \hat{\Gamma} |\hat{\Lambda}|^{1/2} \in \mathbb{R}^{n \times d},$$

where the operator $|\cdot|$ applied to a matrix returns the absolute value of its entries.

For the LSE, consider the eigendecomposition of the Laplacian matrix $L = D^{-1/2} A D^{-1/2}$, where $D = \text{diag}(\Sigma_{i=1}^n A_{ij})$, and substitute the Laplacian matrix L for the adjacency matrix A in the spectral decomposition:

$$L = \hat{\Gamma} \hat{\Lambda} \hat{\Gamma}^T + \hat{\Gamma}_\perp \hat{\Lambda}_\perp \hat{\Gamma}_\perp^T.$$

The LSE is, like the ASE, given by:

$$\hat{X} = \hat{\Gamma} |\hat{\Lambda}|^{1/2} \in \mathbb{R}^{n \times d},$$

but with different values for $\hat{\Gamma}$ and $\hat{\Lambda}$, of course.

For a directed graph, which is reflected in an adjacency matrix that is not symmetric, the generating model may be assumed to be the inner product $\mathbb{P}(A_{ij}=1) = x_i^T x_j$, $x_i, x_j \in \mathbb{X}$ (which is corresponds to the special case of the above-defined generalized inner product in which $d_+=d$ and $d_-=0$). The directed adjacency spectral embedding (DASE) can be estimated using singular value decomposition (SVD). Given a directed graph with adjacency matrix $A \in \{0,1\}^{n \times n}$, and a positive integer d, $1 \leq d \leq n$, consider the singular value decomposition:

$$A = \begin{bmatrix} \hat{U} & \hat{U}_\perp \end{bmatrix} \begin{bmatrix} \hat{D} & 0 \\ 0 & \hat{D}_\perp \end{bmatrix} \begin{bmatrix} \hat{V}^T \\ \hat{V}_\perp^T \end{bmatrix} = \hat{U} \hat{D} \hat{V}^T + \hat{U}_\perp \hat{D}_\perp \hat{V}_\perp^T,$$

where $\hat{D} \in \mathbb{R}_+^{d \times d}$ is a diagonal matrix containing the top d singular values in decreasing order, $\hat{U} \in \mathbb{R}^{n \times d}$ and $\hat{V} \in \mathbb{R}^{n \times d}$ contain the corresponding left and right singular vectors, and the matrices $\hat{D}_\perp$, $\hat{U}_\perp$, and $\hat{V}_\perp$ contain the remaining n−d singular values and vectors. The d-dimensional directed adjacency embedding of A in $\mathbb{R}^d$, is defined as the pair:

$$\hat{X} = \hat{U} \hat{D}^{1/2}, \hat{Y} = \hat{V} \hat{D}^{1/2}.$$

Hence, each node has two different latent positions, representing the behavior of the node as source or destination of the link. Note that DASE can also be extended to bipartite graphs.

Described so far have been various spectral embedding techniques for estimating, from an individual adjacency matrix, latent positions of the nodes of a network graph, whose (generalized) inner products provide link probabilities. The description now turns to adapting these techniques to methods of estimating link probabilities for a network graph at one specific point in time from a series of network graphs, and the corresponding adjacency matrices, associated with other (e.g., preceding) points in time. The general idea is to average or extrapolate the network dynamics as captured in the time series of adjacency matrices in some manner to predict the network link configuration at the specific point in time.

In some embodiments, link prediction involves averaging directly over a time series of adjacency matrices $A_1, A_2, \ldots, A_T$, to make a prediction for the adjacency matrix $A_{T+1}$ at the next point in time T+1. In a simple case, the average may take the form of a collapsed version $\tilde{A}$ of the adjacency matrices:

$$\tilde{A} = \sum_{t=1}^{T} \psi_{T-t+1} A_t,$$

where $\psi_1, \ldots, \psi_T$ is a sequence of scalar weights associated with the backward sequence of adjacency matrices from $A_T$ to $A_1$. Setting, for example, $$\psi_t = \frac{1}{T}$$

$\forall t=1, \ldots T$, the collapsed version $\tilde{A}$ becomes the arithmetic average of the times series of adjacency matrices. The collapsed adjacency matrix $\tilde{A}$, which serves as the estimate or prediction for T+1, can then be spectrally embedded (e.g., using ASE, LSE, or DASE as described above) to compute latent positions for the nodes, corresponding to the vectors $x_i$ within the spectral embedding $\hat{X}$. From the spectral embedding, a link score matrix containing the estimated link probabilities at time T+1 can be computed using the (generalized) inner products of the spectral-embedding vectors. For example, assuming for simplicity that $d_+=d$ and $d_-=0$, the link score matrix is given by:

$$S = \hat{X} \hat{X}^T.$$

A limitation of this simple model for predicting link probabilities is the implicit assumption that the graphs are sampled independently from the same distribution, without any temporal evolution of the network. This limitation can be addressed by using a series of weights $\psi_1, \ldots, \psi_T$ that differ in value for different times based on some assumption of the network dynamic. For example, adjacency matrices closer to the time T+1 for which the prediction is made may be given greater weight than adjacency matrices farther in the past. Or, as another example, if the network behavior is expected to be periodic, the weights themselves may reflect that periodicity (e.g., such that, for a prediction of network behavior on a weekend, the observed behavior on prior weekends is accorded a greater weight than the observed behavior on prior weekdays).

A second limitation of the above model is the implicit assumption that all the possible edges of the adjacency matrix follow the same dynamics, controlled by the parameters $\psi_1, \ldots, \psi_T$. This assumption is particularly limiting in many real-world applications, where different behaviors might be associated with different nodes or links. To provide a more flexible framework that captures edge-specific dynamic, the scalar weights are replaced, in accordance with some embodiments, by a series of weighting matrices $\Psi_1, \ldots, \Psi_T \in \mathbb{R}^{n \times n}$ whose matrix entries provide edge-specific weighting parameters. With these weighting matrices, an extended collapsed matrix $\tilde{A}$ can be obtained as follows:

$$\tilde{A} = \sum_{t=1}^{T} (\Psi_{T-t+1} \odot A_t),$$

where $\odot$ represents the Hadamard element-wise product. Setting the last T−p matrices $\Psi_t$ to the matrix of zeros, $\tilde{A}$ becomes an autoregression of order p. The weighting matrices themselves can be computed from the time series of adjacency matrices $A_1, A_2, \ldots, A_T$, e.g., using an ARIMA or SARIMA model, as explained further below. In some embodiments, for each pair of nodes, the respective time series of matrix entries in the adjacency matrices is independently modeled to obtain the respective time series of weighting matrix entries. Alternatively, correlations between the temporal behavior of different pairs of nodes may be taken into account in a joint or interrelated model.

Figure 3:
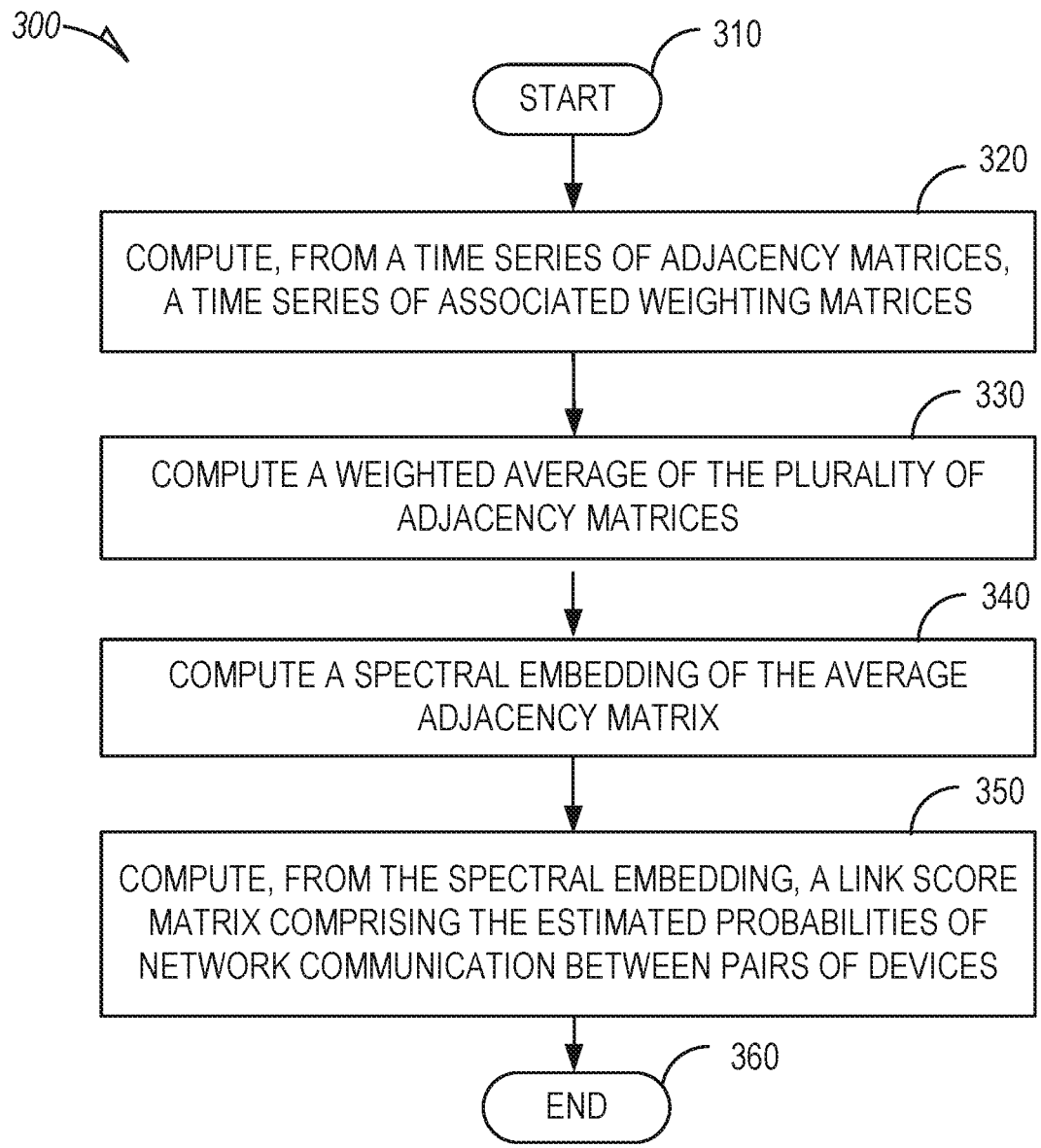
FIG. 3 is a flowchart of a process for link prediction based on an edge-specific average over a time series of adjacency matrices, in accordance with one or more of the disclosed embodiments.

FIG. 3 illustrates, in a flowchart, a process 300 for link prediction based on an edge-specific average over a time series of adjacency matrices, in accordance with one or more embodiments. Starting point 310 of the process 300 is the time series of adjacency matrices $A_1, A_2, \ldots, A_T \in \mathbb{R}^{n \times n}$ associated with a plurality of first time intervals, e.g., as generated based on monitored network communications (operation 230 in FIG. 2). In operation 320, a time series of weighting matrices $\Psi_1, \ldots, \Psi_T \in \mathbb{R}^{n \times n}$ is computed from the time series of adjacency matrices. In operation 330, these weighting matrices are used in computing a weighted average of the plurality of adjacency matrices, e.g., according to $\tilde{A} = \Sigma_{t=1}^{T}(\Psi_{T-t+1} \odot A_t)$. In operation 340, the average adjacency matrix $\tilde{A}$ is spectrally embedded. e.g., using an ASE, LSE, or DASE technique as described above. In operation 350, a link score matrix S comprising the estimated probabilities of links between nodes (e.g., reflecting network communication between pairs of devices) during a second time interval is computed from the spectral embedding $\hat{X}$ according to: $S=\hat{X}\hat{X}^T$. With the determination of the link score matrix, link prediction ends at 360. The predicted links can subsequently be used, e.g., for anomaly detection by comparing the estimated link probabilities against an observed adjacency matrix for the time interval and identifying nodes and corresponding devices exhibiting anomalous behavior (operations 250-280 in FIG. 2).

In some embodiments, link prediction involves, rather than averaging at the outset over the time series of adjacency matrices $A_1, A_2, \ldots, A_T$, processing the adjacency matrices individually to obtain a time series of respective individual GRDPG-based link score matrices $S_1, S_2, \ldots, S_T$ computed from standard spectral embeddings $\hat{X}_t$ (t=1, ... T) according to $S_t = \hat{X}_t \hat{X}_t^T$, and then making a prediction S for the link score matrix at time T+1. The prediction may be a simple average:

$$S = \frac{1}{T} \sum_{t=1}^{T} \hat{X}_t \hat{X}_t^T,$$

a weighted average with scalar weights:

$$S = \Sigma_{t=1}^{T} \psi_{T-t+1} \hat{X}_t \hat{X}_t^T,$$

or a weighted average with weighting matrices that allow for edge-specific weighting:

$$S = \Sigma_{t=1}^{T} (\Psi_{T-t+1} \odot \hat{X}_t \hat{X}_t^T).$$

Setting the last T−p matrices $\Psi_t$ to the matrix of zeros, S becomes an autoregression of order p. The weighting matrices themselves can be computed, for example, from the time series of (generalized) inner products of the spectral embedding vectors (or, equivalently, the time series of link score matrices), e.g., using an ARIMA or SARIMA model, as explained further below. In some embodiments, for each pair of nodes, the associated time series of (generalized) inner products of the respective vectors in the spectral embeddings is independently modeled to obtain the respective time series of weighting matrix entries. Alternatively, correlations between the temporal behavior of different pairs of nodes may be taken into account in a joint or interrelated model. Note that, while the weighting matrices used in averaging the binary adjacency matrices are computed from the binary time series of those adjacency matrices, the weighting matrices used in averaging the real-valued link score matrices are computed from a real-valued time series.

Figure 4:
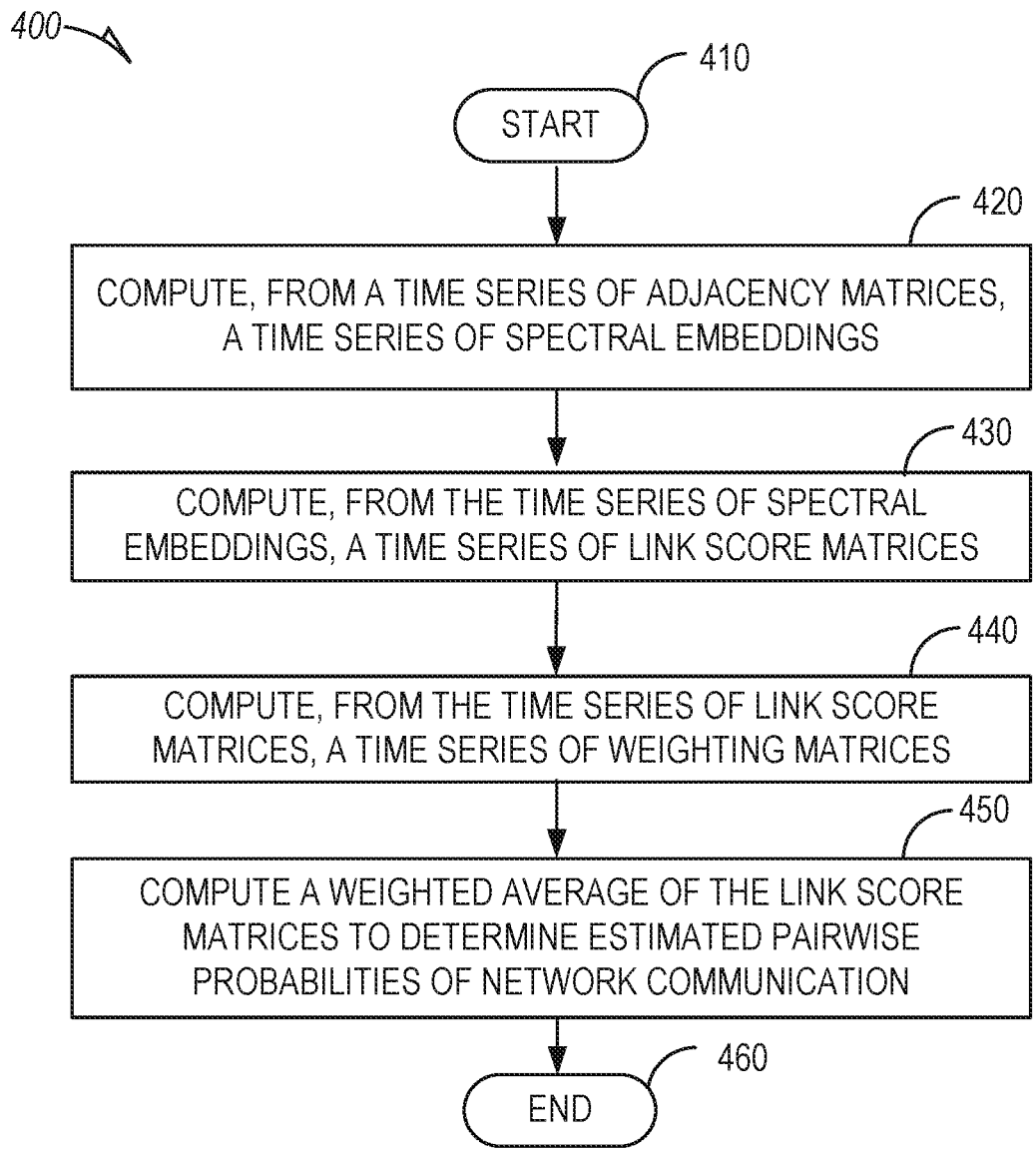
FIG. 4 is a flowchart of a process for link prediction based on an edge-specific average over a time series of link score matrices, in accordance with one or more of the disclosed embodiments.

FIG. 4 illustrates, in a flowchart, a process 400 for link prediction based on an edge-specific average over a time series of link score matrices, in accordance with one or more embodiments. Starting point 410 of the process 400 is, again, the time series of adjacency matrices $A_1, A_2, \ldots, A_T \in \mathbb{R}^{n \times n}$ associated with a plurality of first time intervals, e.g., as generated based on monitored network communications (operation 230 in FIG. 2). In operation 420, the adjacency matrices $A_1, A_2, \ldots, A_T \in \mathbb{R}^{n \times n}$ are each individually processed. e.g., by ASE, LSE, or DASE as described above, to obtain a time series of spectral embeddings $\hat{X}_1, \hat{X}_2, \ldots, \hat{X}_T$. In operation 430, a time series of link score matrices is computed from the time series of spectral embeddings according to $S_t = \hat{X}_t \hat{X}_t^T$. In operation 440, a time series of weighting matrices $\Psi_1, \ldots, \Psi_T \in \mathbb{R}^{n \times n}$ is computed from the time series of link score matrices. In operation 450, these weighting matrices are used in computing a weighted average of the link score matrices, e.g., according to $S = \Sigma_{t=1}^{T} (\Psi_{T-t+1} \odot S_t) = \Sigma_{t=1}^{T} (\Psi_{T-t+1} \odot \hat{X}_t \hat{X}_t^T)$. The resulting average link score matrix S contains the estimated probabilities of links between nodes (e.g., reflecting network communication between pairs of devices) during the second time interval. With the determination of these estimated link probabilities, link prediction ends at 460. The predicted links can subsequently be used, e.g., for anomaly detection by comparing the estimated link probabilities against an observed adjacency matrix for the time interval and identifying nodes and corresponding devices exhibiting anomalous behavior (operations 250-280 in FIG. 2).

In yet another approach, link prediction based on a time series of adjacency matrices involves first spectrally embedding the individual adjacency matrices $A_1, A_2, \ldots, A_T$, to obtain a time series of spectral embeddings $\hat{X}_1, \hat{X}_2, \ldots, \hat{X}_T$, and then computing an averaged or otherwise predicted embedding $\overline{X}$ based on $\hat{X}_1, \hat{X}_2, \ldots, \hat{X}_T$, and using it for calculating the link score matrix according to $S = \overline{X}\overline{X}^T$. This procedure is particularly complex, since the embeddings are not directly comparable. In the GRDPG setting, $\mathbb{E}(A) = XI(d_+, d_-)X^T = (XQ)I(d_+, d_-)(XQ)^T \forall Q \in \mathbb{O}(d_+, d_-)$, where $\mathbb{O}(d_+, d_-)$ is the indefinite orthogonal group with signature $(d_+, d_-)$. In other words, spectral embeddings are unique only up to rotation. To render the individual embedding vectors comparable across the time series of embeddings, the embedding vectors are therefore first aligned, and then the predicted embedding is computed from the aligned embedding vectors. Further, the same values of $d_+$ and $d_-$ are used for each embedding to render the procedure meaningful, which implies that the ASE is modified to look at the top $d_+$ and $d_-$ eigenvalues at both ends of the spectrum.

A suitable technique to jointly align $\hat{X}_1, \hat{X}_2, \ldots, \hat{X}_T$, provided that the same values of $d_+$ and $d_-$ are used, is based on Procrustes analysis, a technique known to those of ordinary skill in the art from other contexts, but herein adapted to the alignment of spectral embeddings as follows. Assume, for simplicity, that $d_- = 0$ in the GRDPG setting, implying $d = d_+$. Given two spectral embeddings (or, for purposes of this discussion, "shapes") $\hat{X}_1, \hat{X}_2 \in \mathbb{R}^{n \times d}$, Procrustes analysis aims to find the optimal rotation $P_{\hat{X}_1}(\hat{X}_2)$ of $\hat{X}_2$ on $\hat{X}_1$ based on the following minimization criterion:

$$\min_{\Omega \in \mathbb{O}(d)} \|\hat{X}_1 - \hat{X}_2\Omega\|_F,$$

where $\Omega \in \mathbb{O}(d)$ is an orthogonal matrix ($\Omega^T\Omega = \Omega\Omega^T = I(d, 0)$), and $\|\cdot\|_F$ denotes the Frobenius norm $\|M\|_F^2 = \text{tr}(M^T M)$, where $\text{tr}(\cdot)$ is the trace. The solution of the minimization problem is based on the SVD of $\hat{X}_2^T\hat{X}_1 : \hat{X}_2^T\hat{X}_1 = \tilde{U}\tilde{D}\tilde{V}^T$. The solution is: $\Omega^* = \tilde{U}\tilde{V}^T$, and it follows that the optimal rotation of $\hat{X}_2$ onto $\hat{X}_1$ is:

$$P_{\hat{X}_1}(\hat{X}_2) = \hat{X}_2 \tilde{U}\tilde{V}^T.$$

It is possible to use the same method to superimpose a set of T shapes $\hat{X}_t \in \mathbb{R}^{n \times r}$, $t = 1, \ldots, T$, choosing a reference shape $\tilde{X}$, but improved results may be obtained by generalized Procrustes analysis (GPA). The GPA algorithm uses the following minimization criterion:

$$\min_{\Omega_j \in \mathbb{O}(d)} \sum_{j=1}^T \|\hat{X}_j\Omega_j - \tilde{X}\|_F^2$$

$$\text{such that } \sum_{j=1}^T S^2(\hat{X}_j) = \sum_{j=1}^T S^2(\hat{X}_j\Omega_j),$$

where, similarly as above, $\Omega_j \in \mathbb{O}(d)$ is a shape-specific orthogonal matrix. Additionally, $\tilde{X} \in \mathbb{R}^{n \times r}$ is a reference shape, shared across the T shapes, and $S(\cdot)$ is the centroid size $$S(M) = \left\|\left(I_n - \frac{1}{n}1_n 1_n^T\right)M\right\|_F.$$

The GPA algorithm solves the minimization problem by iterating standard Procrustes analysis, after a suitable initialization of the reference shape by:

(1) updating the shapes $\hat{X}_j$, performing a standard Procrustes superimposition of each $\hat{X}_j$ on $\tilde{X}: \hat{X}_j \leftarrow \hat{X}_j \tilde{U}_j \tilde{V}_j^T$, where $\hat{X}_j^T \tilde{X} = \tilde{U}_j \tilde{D}_j \tilde{V}_j^T$, (2) updating the reference shape: $\tilde{X} = \Sigma_{t=1}^T \hat{X}_t$, and (3) repeating steps (1) and (2) until the difference between two consecutive values of $\Sigma_{j=1}^T \|\hat{X}_j\Omega_j - \tilde{X}\|_F^2$ is within a tolerance η.

When $d_- \neq 0$, the problem, known as the indefinite Procrustes problem, does not have a closed-form solution. In this setting, the criterion $$\min_{\Omega \in \mathbb{O}(d_+, d_-)} \|\hat{X}_1 - \hat{X}_2\Omega\|_F,$$

may be optimized numerically. The optimization routine may be applied iteratively in the GPA algorithm, which is essentially a sequence of pairwise Procrustes alignments, to obtain an indefinite GPA.

On the other hand, for directed and bipartite graphs, the minimization criterion is optimized jointly for the two embeddings obtained using DASE. An approximated fast procedure for iteratively optimizing, jointly for two embeddings $(\hat{X}_1, \hat{Y}_1)$ and $(\hat{X}_2, \hat{Y}_2)$.

$$\min_{\Omega \in \mathbb{O}(d)} \|\hat{X}_1 - \hat{X}_2\Omega\|_F \text{ and } \min_{\Omega \in \mathbb{O}(d)} \|\hat{Y}_1 - \hat{Y}_2\Omega\|_F,$$

involves:

(1) initializing $\Omega^* = I(d, 0)$, the identity matrix, and (2) repeating until convergence in $\Omega^*$:

$$\Omega^* \leftarrow \Omega^* \arg\min_{\Omega \in \mathbb{O}(d)} \|\hat{X}_1 - \hat{X}_2\Omega^*\Omega\|_F, \quad (a)$$

$$\Omega^* \leftarrow \Omega^* \arg\min_{\Omega \in \mathbb{O}(d)} \|\hat{Y}_1 - \hat{Y}_2\Omega^*\Omega\|_F, \quad (b)$$

Alternatively, the joint criterion may be optimized numerically. Note that the procedure can also iterated for a joint generalized Procrustes algorithm.

Figure 5:
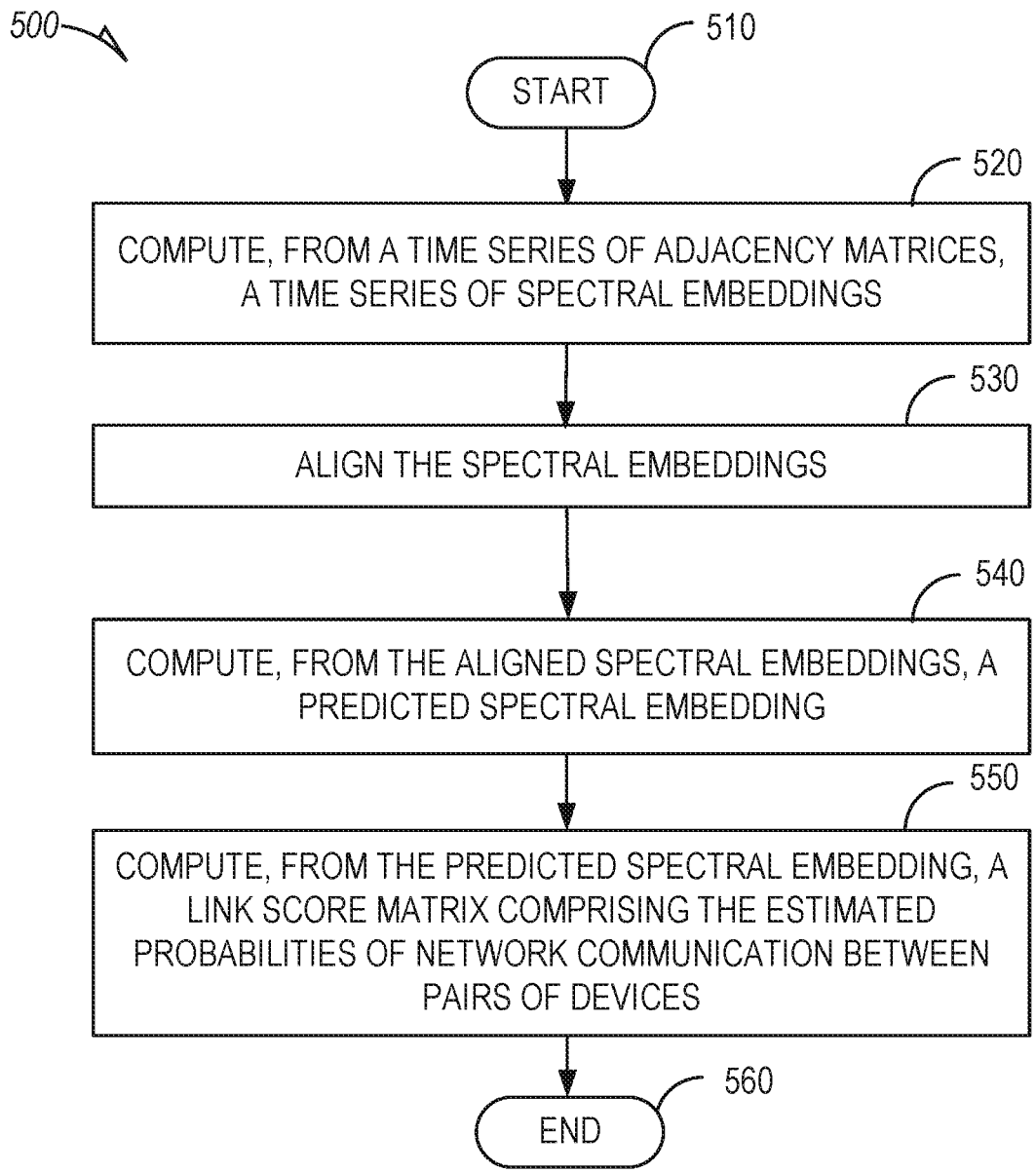
FIG. 5 is a flowchart of a process for link prediction based on an average over spectral embeddings computed from a time series of adjacency matrices, in accordance with one or more of the disclosed embodiments.

FIG. 5 illustrates, in a flowchart, a process 500 for link prediction based on an average over spectral embeddings computed from a time series of adjacency matrices, in accordance with one or more embodiments. Starting point 510 of the process 500 is, again, the time series of adjacency matrices $A_1, A_2, \ldots, A_T \in \mathbb{R}^{n \times n}$ associated with a plurality of first time intervals, e.g., as generated based on monitored network communications (operation 230 in FIG. 2). In operation 520, the adjacency matrices $A_1, A_2, \ldots, A_T \in \mathbb{R}^{n \times n}$ are each individually processed, e.g., by ASE, LSE, or DASE as described above, to obtain a time series of spectral embeddings $\hat{X}_1, \hat{X}_2, \ldots, \hat{X}_T$. From these spectral embeddings, a predicted spectral embedding $\overline{X}$, associated with the second time interval, is computed in two steps: In operation 530, the spectral embeddings $\hat{X}_1, \hat{X}_2, \ldots, \hat{X}_T$ are aligned, e.g., using (e.g., generalized) Procrustes analysis as described above, and in operation 540, the predicted spectral embedding is computed from the aligned spectral embeddings $\hat{X}'_1, \hat{X}'_2, \ldots, \hat{X}'_T$, using a suitable model of the time series of aligned spectral embeddings. The model may be, e.g., an ARIMA or SARIMA model as described further below, and/or a weighted average over the aligned spectral embeddings. Since each of the spectral embeddings includes n d-dimensional spectral-embedding vectors for the n nodes of the network graph, the time series of aligned spectral embeddings contains n×d element-wise time series, which are, in some embodiments, all independently modeled for maximum flexibility. Alternatively, different models may be used for different nodes and their associated time series of spectral embedding vectors, while the same model is shared for all elements within the spectral embedding vectors associated with a given node. In operation 550, the link score matrix S containing the estimated probabilities network communications between pairs of devices is computed from the predicted spectral embedding $\overline{X}$, e.g., using a (generalized) inner product such that $S=\overline{X}\overline{X}^T$. With the determination of these estimated link probabilities, link prediction ends at 560. The predicted links can subsequently be used, e.g., for anomaly detection by comparing the estimated link probabilities against an observed adjacency matrix for the time interval and identifying nodes and corresponding devices exhibiting anomalous behavior (operations 250-280 in FIG. 2).

A further technique for link prediction uses the COSIE model, which may be viewed as an extension of RDPGs for dynamic networks. In COSIE networks, the latent positions are assumed to be common across the T snapshots of the graph, but the link probabilities are scaled by a time-varying matrix $R_t \in \mathbb{R}^{d \times d}$ (the COSIE matrix), with expected values for the adjacency matrix being computed according to:

$$\mathbb{E}(A_t) = XR_tX^T.$$

The common latent positions X and the time series of weighting matrices $R_1, \ldots, R_T$ can be estimated via a multiple adjacency spectral embedding (MASE), defined as follows: Given a sequence of network adjacency matrices $A_1, A_2, \ldots, A_T \in \mathbb{R}^{n \times n}$, and an integer $d \in \{1, \ldots, n\}$, obtain the individual ASEs $\hat{X}_t = \hat{\Gamma}_t |\hat{\Lambda}_t|^{1/2} \in \mathbb{R}^{n \times d}$. Then, construct the n×Td matrix $$\hat{\Gamma} = [\hat{\Gamma}_1, \ldots, \hat{\Gamma}_T] \in \mathbb{R}^{n \times Td},$$

and consider its singular value decomposition $$\hat{\Gamma} = \hat{U}\hat{D}\hat{V}^T + \hat{U}_\perp \hat{D}_\perp \hat{V}_\perp^T,$$

where $\hat{D} \in \mathbb{R}_+^{d \times d}$ is a diagonal matrix containing the top d singular values in decreasing order, $\hat{U} \in \mathbb{R}^{n \times d}$ and $\hat{V} \in \mathbb{R}^{n \times d}$ contain the corresponding left and right singular vectors, and the matrices $\hat{D}_\perp$, $\hat{U}_\perp$, and $\hat{V}_\perp$ contain the remaining singular values and vectors. The d-dimensional multiple adjacency embedding of $A_1, A_2, \ldots, A_T$ in $\mathbb{R}^d$ is given by $\hat{X} = \hat{U}$, which provides an estimate of the spectral embedding X, and the sequence $\hat{R}_1, \ldots, \hat{R}_T$, where $$\hat{R}_t = \hat{U}^T A_t \hat{U}.$$

From the time series of estimates $\hat{R}_1, \ldots, \hat{R}_T$, a predicted COSIE matrix $\overline{R}$ can be obtained. e.g., by ARIMA or SARIMA modeling as described further below. In some embodiments, independent models are fitted to the d×d time series corresponding to each entry of the COSIE matrix. Combining the predicted COSIE matrix $\overline{R}$ with the spectral embedding $\hat{X}$ yields the following link score matrix:

$$S = \hat{X}\overline{R}\hat{X}^T.$$

Alternatively, the link score matrix may be obtained from the time series of estimated link probabilities $\hat{X}\hat{R}_1\hat{X}^T, \ldots, \hat{X}\hat{R}_T\hat{X}^T$ e.g., by simple averaging:

$$S = \frac{1}{T}\sum_{t=1}^{T} \hat{X}\hat{R}_t\hat{X}^T,$$

or by weighted averaging with scalar weights or weighting matrices.

Note that the COSIE model has been described for undirected graphs, but can straightforwardly be extended to directed and bipartite graphs, assuming $\mathbb{E}(A_t) = XR_tY^T$, which leads to estimates $\hat{R}_t = \hat{U}^T A_t \hat{V}$, where $\hat{V}$ is an estimate of Y obtained from MASE on $\hat{Y}_1, \ldots, \hat{Y}_T$.

Figure 6:
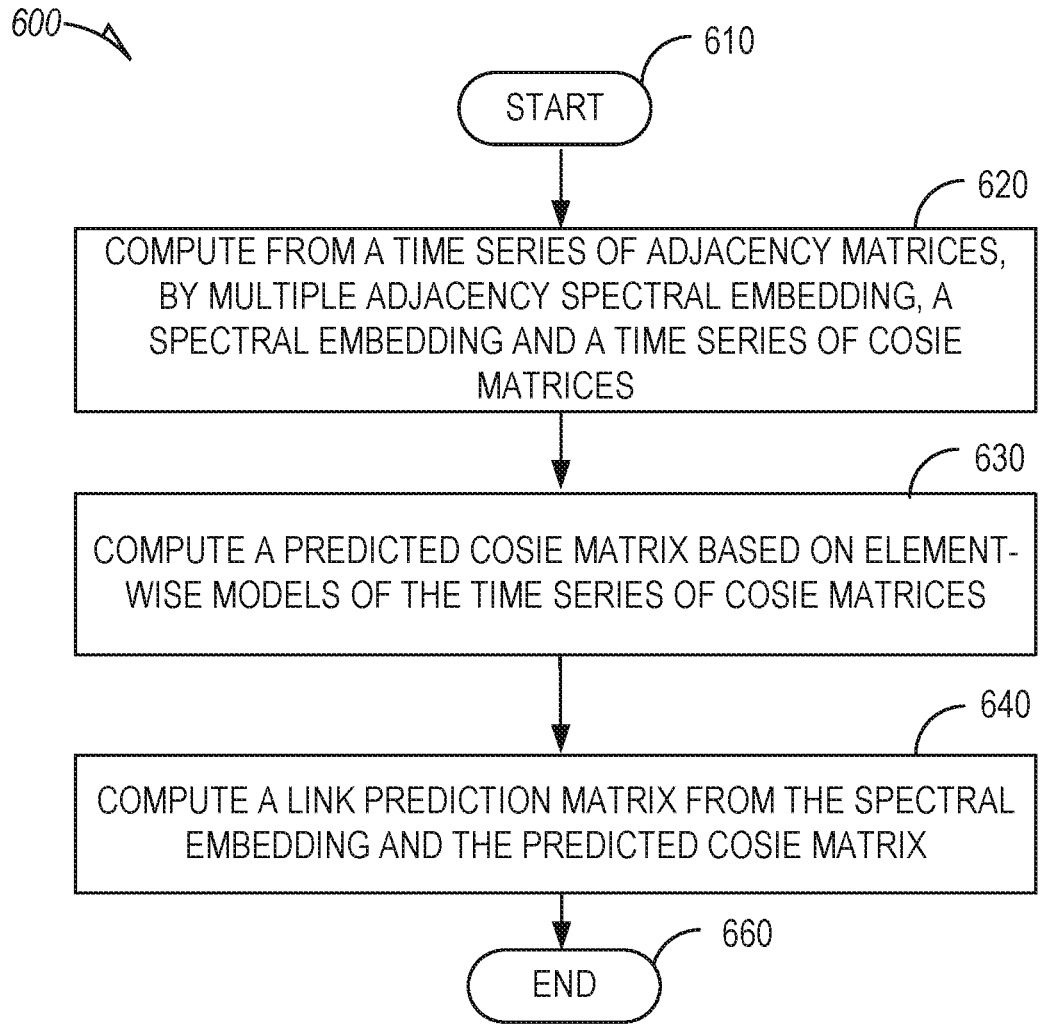
FIG. 6 is a flowchart of a process for link prediction based on a COSIE model, in accordance with one or more of the disclosed embodiments.

FIG. 6 illustrates, in a flowchart, a process 600 for link prediction based on a COSIE model. Starting point 610 of the process 600 is, again, the time series of adjacency matrices $A_1, A_2, \ldots, A_T \in \mathbb{R}^{n \times n}$ associated with a plurality of first time intervals, e.g., as generated based on monitored network communications (operation 230 in FIG. 2). In operation 620, the adjacency matrices $A_1, A_2, \ldots, A_T \in \mathbb{R}^{n \times n}$ are processed jointly by MASE to compute an estimated common spectral embedding $\hat{X}$ as well as a time series of COSIE matrices $\hat{R}_1, \ldots, \hat{R}_T$. In operation 630, the series is modeled, e.g., using ARIMA or SARIMA, to predict a COSIE matrix for the second time interval. To account for edge-specific dynamics, the elements of the predicted COSIE matrix may be computed based on independent respective models of the respective elements of the time series of COSIE matrices. In operation 640, a link score matrix is computed from the common spectral embedding $\hat{X}$ in conjunction with the predicted COSIE matrix, according to $S = \hat{X}\overline{R}\hat{X}^T$. With the determination of these estimated link probabilities in the link score matrix, link prediction ends at 660. The predicted links can subsequently be used, e.g., for anomaly detection by comparing the estimated link probabilities against an observed adjacency matrix for the time interval and identifying nodes and corresponding devices exhibiting anomalous behavior (operations 250-280 in FIG. 2).

In various embodiments, the above-described processes 300, 400, 500, 600 for link prediction take network dynamics into account at the granularity of individual edges by using edge-specific weights or model parameters when averaging over, or otherwise modeling, time series (such as, e.g., the time series of adjacency matrices, link scores, or spectral embeddings). Time series modeling is achieved, in some embodiments, using seasonal ARIMA models, which are beneficial due to their flexible modelling assumptions. In general, a time series $Z_1, \ldots, Z_T$ is a seasonal ARIMA(p, b, q)(P, B, Q)$_s$ with period s if the differenced series $\tilde{Z}_t = (1-L)^b(1-L^s)^B Z_t$, where L is the lag operator $L^k Z_t = Z_{t-k}$, is a causal ARMA process defined by the equation $\phi(L)\Phi(L^s)\tilde{Z}_t = \theta(L)\Theta(L^s)\varepsilon_t$, $\varepsilon_t \stackrel{iid}{\sim} \mathbb{N}(0, \sigma^2)$, where $\phi(v) = 1 - \phi_1 v - \ldots - \phi_p v^p$, $\Phi(v) = 1 - \Phi_1 v - \ldots - \Phi_P v^P$, $\theta(v) = 1 + \theta_1 v + \ldots + \theta_q v^q$, and $\Theta(v) = 1 + \Theta_1 v + \ldots + \Theta_Q v^Q$. Note that the process is casual if and only if $\phi(v) \neq 0$ and $\Phi(v) \neq 0$ for $|v| \leq 1$. The value of s usually depends on the application domain. In computer networks with daily network snapshots, s=7, which represents a periodicity of one week. The remaining parameters, p, b, q, P, B and Q, could be estimated using Akaike information criterion (AIC) or Bayesian information criterion (BIC). For small values of T, the corrected AIC criterion (AICc) may be preferred. If s is unknown, information criteria may be also used for estimation. The corresponding coefficients of the polynomials $\phi(v)$, $\Phi(v)$, $\theta(v)$ and $\Theta(v)$, and the variance of the process $\sigma^2$, can be estimated via maximum likelihood, using standard techniques in time-series analysis. Algorithms for the automatic selection of the parameters in seasonal ARIMA models are known to those of ordinary skill in the art.

For the prediction of future values $Z_{t+1}$, the general forecasting equation is obtained from $\phi(L)\Phi(L^s)\tilde{Z}_t=\theta(L)\Theta(L^s)\varepsilon_t$, $\varepsilon_t \stackrel{iid}{\sim} \mathbb{N}(0, \sigma^2)$ by using the relationship $\tilde{Z}_{t+1}=(1-L)^b(1-L^s)^B Z_{t+1}$, solving for $Z_{t+1}$, and setting $\varepsilon_{t+1}$ to its expected value $\mathbb{E}(\varepsilon_{t+1})=0$, obtaining an estimate $\hat{Z}_{t+1}$ from the known terms of the equation; k-steps ahead forecasts for $Z_{t+k}$ can be obtained analogously.

Note that the average over adjacency matrices $\tilde{A}=\Sigma_{t=1}^T (\Psi_{T-t+1} \odot A_t)$ as may be used in process 300 and the average over link score matrices $S=\Sigma_{t=1}^T (\Psi_{T-t+1} \odot \hat{X}_t \hat{X}_t^T)$ as may be used in process 400 are explicitly modeled using autoregressive coefficients, which is more restrictive than the above generic form of $\phi(L)\Phi(L^s)\tilde{Z}_t$. In this more restrictive setting, the parameters may be estimated assuming a seasonal $AR(p)(P)_s$ model and using maximum likelihood with AIC or BIC penalization, corresponding to the equation $$\phi(L)\Phi(L^s)Z_t=\varepsilon_t, \varepsilon_t \stackrel{iid}{\sim} \mathbb{N}(0,\sigma^2).$$

The AR form is beneficial in this context because of its interpretability over a model including a moving average term.

To model the average adjacency matrix $\tilde{A}=\Sigma_{t=1}^T (\Psi_{T-t+1} \odot A_t)$, one of a number of models specifically designed for binary time series, as are known in the art, may be used in place of a SARIMA model. One common approach for modeling binary time series is to assume that $A_{ijt} \stackrel{d}{\sim} \text{Bernoulli}(\pi_t)$, $\pi_t \in [0, 1]$, where the parameter $\pi_t$ is then mapped to an underlying process $z_t$ in $\mathbb{R}$ using, for example, the probit or logistic transformations. The process $z_t$ is then assumed to change dynamically according to an underlying process, which could be, for example, a SARIMA model. Example models are the dynamic binary response model (described, e.g., in H. Kauppi et al., "Predicting U.S. recessions with dynamic binary response models." The Review of Economics and Statistics, vol. 90, no. 4, pp. 777-791, 2008, herein incorporated by reference) and GARMA models (described, e.g., in M. A. Benjamin et al. "Generalized autoregressive moving average models," Journal of the American Statistical Association, vol, 98, no. 461, pp. 214-223, 2003, herein incorporated by reference).

FIGS. 7A-7D show example results of various link prediction processes on simulated seasonal data, each comparing the performance achieved with and without accounting for edge-specific dynamics. Performance is measured in terms of the well-known area under the curve (AUC) metric. The simulated data was obtained from stochastic block models, which can be interpreted as a special case of a GRDPG: each node is assigned a latent position $\mu_{z_i} \in \mathbb{R}^d$, and the probability of a link (i,j) only depends on the communication allocation of the two nodes:

$$\mathbb{P}(A_{ij}=1)=\mu_{z_i}^T I(d_+, d_-)\mu_{z_j}.$$

In the simulation, a within-community probability matrix $B=\{B_{ij}\} \in [0,1]^{K \times K}$, where B is the probability of a link between two nodes in communities i and j, and K is the number of communities, was generated from a beta distribution Beta(1.2, 1.2) This choice of the parameters allows to have fairly heterogeneous link probabilities in B. The matrix has full rank with probability 1, hence K=d. The community allocations were chosen to be time-dependent seasonality of one week. For each node, community allocations $z_{i,s}$ s=1, . . . , S with S=7, were sampled at random from $\{1, \ldots, K\}$. Then, the adjacency matrices were obtained as:

$$\mathbb{P}(A_{ij}=1) = B_{z_{i,t \bmod 7+1}, z_{j,t \bmod 7+1}}, t=1, \ldots, T,$$

For a total of T=100 snapshots of the network. Therefore, the link probabilities change over time, with a periodicity of seven days. Models were fitted using the first T'=80 snapshots of the graph as training set, with the objective of predicting the estimated link probabilities corresponding to the remaining T-T' adjacency matrices.

Figure 7A:
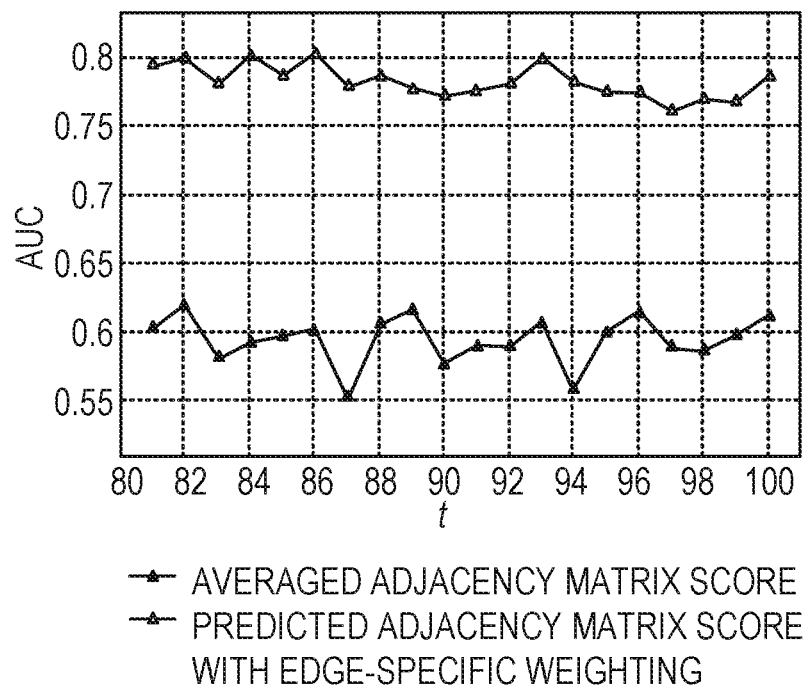
FIGS. 7A-7D are graphs showing example results of various link prediction processes in accordance with the disclosed embodiments on simulated seasonal data.
Figure 7B:
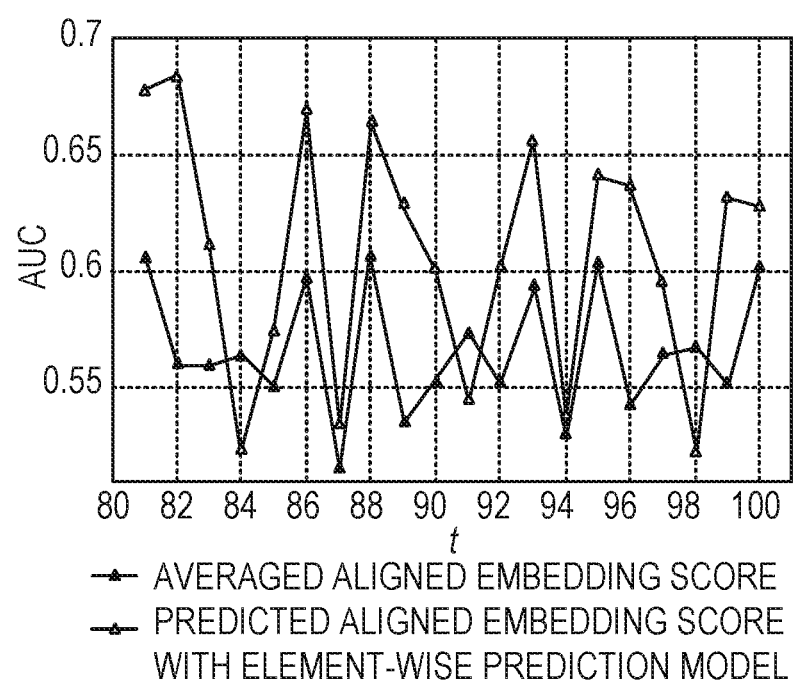
Figure 7C:
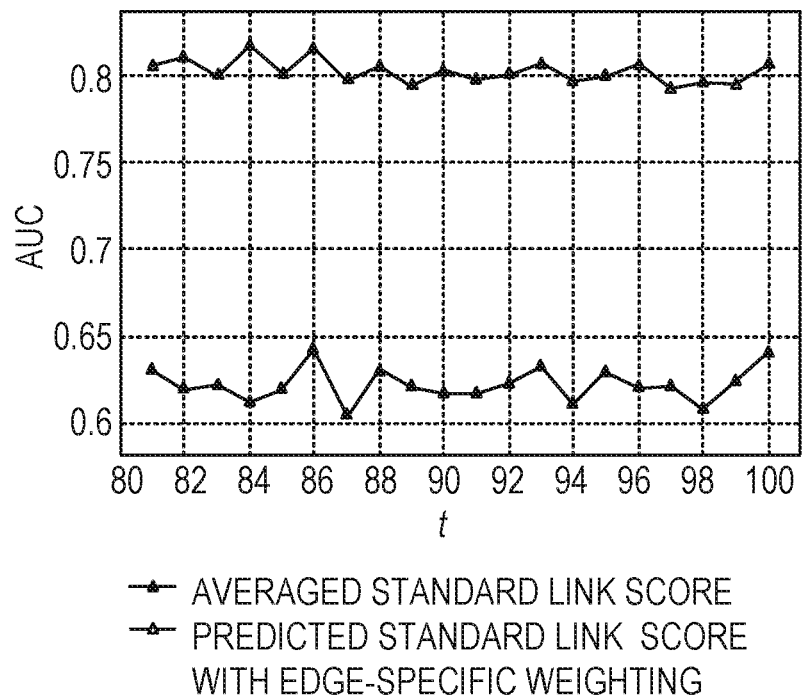
Figure 7D:
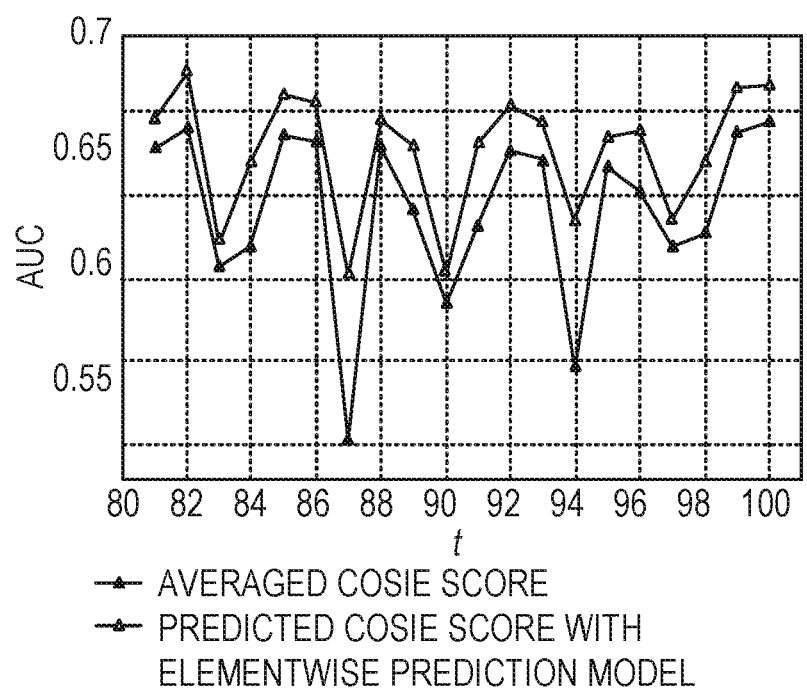

FIG. 7A shows link prediction based on a collapsed adjacency matrix, computed as a simple arithmetic average ($\tilde{A}=\Sigma_{t=1}^T A_t$) and with edge-specific weighting ($\tilde{A}=\Sigma_{t=1}^T (\Psi_{T-t+1} \odot A_t)$) in accordance with process 300, respectively. FIG. 7B shows link prediction from a time series of aligned spectral embeddings by simple arithmetic averaging or prediction with elementwise prediction models in accordance with process 500, respectively. FIG. 7C shows link prediction based on a time series of link score matrices by simple arithmetic averaging $$\left(S = \frac{1}{T}\Sigma_{t=1}^T S_t\right)$$

or averaging with edge-specific weighting ($S=\Sigma_{t=1}^T (\Psi_{T-t+1} \odot S_t)$) in accordance with process 400, respectively. FIG. 7D shows link prediction using a COSIE model, with the predicted COSIE matrix computed as a simple arithmetic average of a time series of COSIE matrices or predicted from the time series with elementwise prediction models in accordance with process 600, respectively. In all cases, the time-series models to compute edge-specific weighting matrices or otherwise obtain element-wise predictions were obtained by fitting to the training data set using the function auto_arima in the statistical Python library pmdarima, using the corrected AIC criterion to estimate the number of parameters.

As can be seen in FIGS. 7A-7D, link prediction with the time-series models generally outperforms simple averages that do not take edge-specific dynamics into account. The improvement is particularly significant in embodiments that utilize a collapsed adjacency matrix or computed link probabilities from a time series of link score matrices; these two methods also achieve the best overall performance across all methods compared. While this data illustrates the benefits of using edge-specific or element-wise weights and models in link prediction in accordance with various embodiments, it will be appreciated by those of ordinary skill in the art that the depicted performance data is merely an example, and that quantitative performance and performance improvements associated with the various methods described herein may generally vary depending on, e.g., the data sets to which they are applied as well as implementation details.

Figure 8:
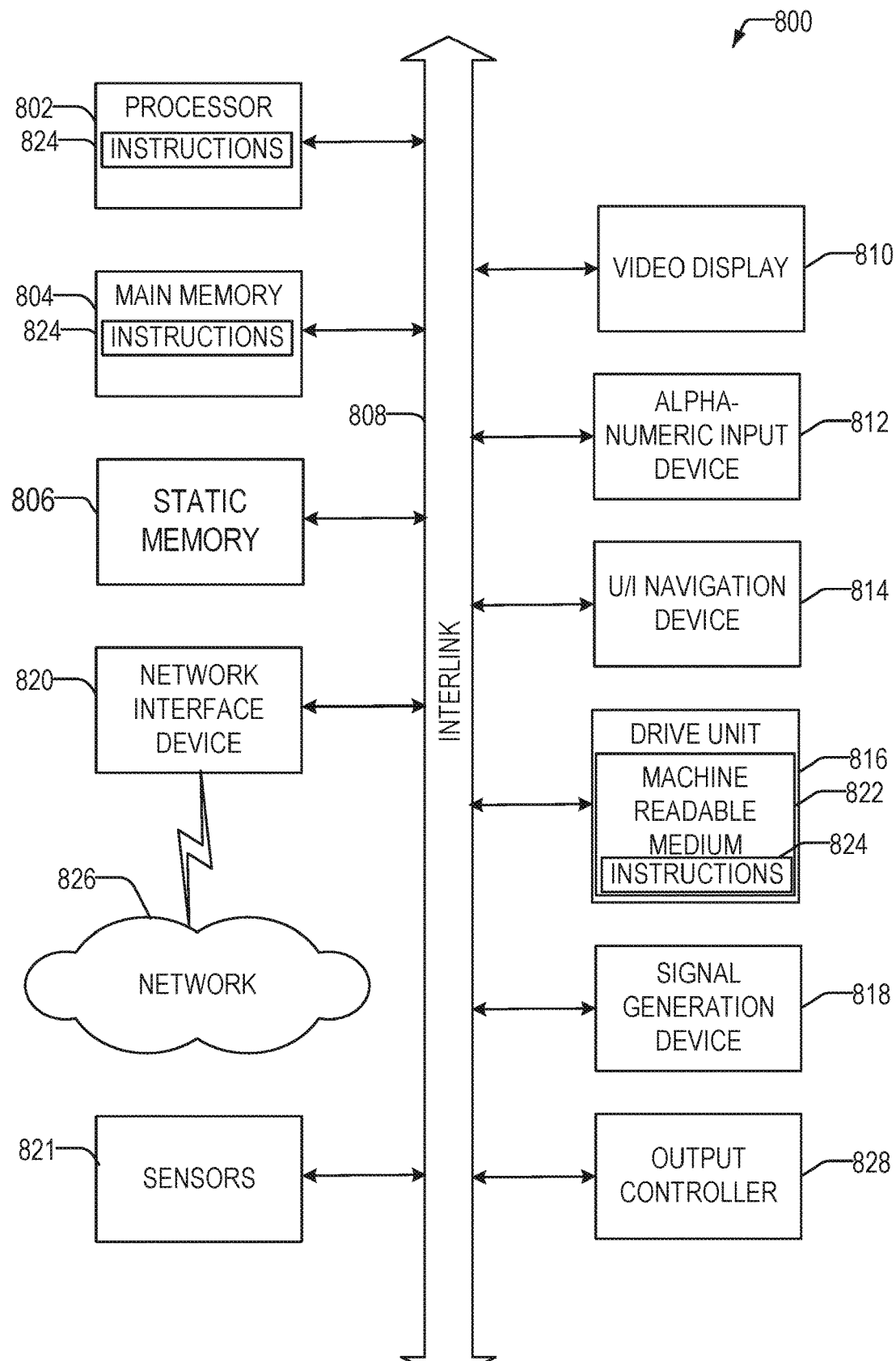
FIG. 8 is a block diagram of an example machine that may perform any one or more of the processes discussed herein.

FIG. 8 illustrates a block diagram of an example machine 800 upon which any one or more of the techniques (e.g., methodologies) discussed herein may perform. In alternative embodiments, the machine 800 may operate as a standalone device or may be connected (e.g., networked) to other machines. In a networked deployment, the machine 800 may operate in the capacity of a server machine, a client machine, or both in server-client network environments. In an example, the machine 800 may act as a peer machine in peer-to-peer (P2P) (or other distributed) network environment. The machine 800 may be a personal computer (PC), a tablet PC, a set-top box (STB), a personal digital assistant (PDA), a mobile telephone, a smart phone, a web appliance, a network router, switch or bridge, a server computer, a database, conference room equipment, or any machine capable of executing instructions (sequential or otherwise) that specify actions to be taken by that machine. In various embodiments, machine 800 may perform one or more of the processes described above with respect to FIGS. 2-6 above. For example, the machine 800 represents, in some embodiments, the security system 110 of FIG. 1. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), other computer cluster configurations.

Machine (e.g., computer system) 800 may include a hardware processor 802 (e.g., a central processing unit (CPU), a graphics processing unit (GPU), a hardware processor core, or any combination thereof), a main memory 804 and a static memory 806, some or all of which may communicate with each other via an interlink (e.g., bus) 808. The machine 800 may further include a display unit 810, an alphanumeric input device 812 (e.g., a keyboard), and a user interface (UI) navigation device 814 (e.g., a mouse). In an example, the display unit 810, input device 812 and UI navigation device 814 may be a touch screen display. The machine 800 may additionally include a storage device (e.g., drive unit) 816, a signal generation device 818 (e.g., a speaker), a network interface device 820, and one or more sensors 821, such as a global positioning system (GPS) sensor, compass, accelerometer, or other sensor. The machine 800 may include an output controller 828, such as a serial (e.g., universal serial bus (USB), parallel, or other wired or wireless (e.g., infrared(IR), near field communication (NFC), etc.) connection to communicate or control one or more peripheral devices (e.g., a printer, card reader, etc.).

The storage device 816 may include a machine-readable medium 822 on which is stored one or more sets of data structures or instructions 824 (e.g., software) embodying or utilized by any one or more of the techniques or functions described herein. The instructions 824 may also reside, completely or at least partially, within the main memory 804, within static memory 806, or within the hardware processor 802 during execution thereof by the machine 800. In an example, one or any combination of the hardware processor 802, the main memory 804, the static memory 806, or the storage device 816 may constitute machine-readable media.

While the machine-readable medium 822 is illustrated as a single medium, the term "machine-readable medium" may include a single medium or multiple media (e.g., a centralized or distributed database, and/or associated caches and servers) configured to store the one or more instructions 824.

The term "machine-readable medium" may include any medium that is capable of storing, encoding, or carrying instructions for execution by the machine 800 and that cause the machine 800 to perform any one or more of the techniques of the present disclosure, or that is capable of storing, encoding or carrying data structures used by or associated with such instructions. Non-limiting machine-readable medium examples may include solid-state memories, and optical and magnetic media. Specific examples of machine-readable media may include: non-volatile memory, such as semiconductor memory devices (e.g., Electrically Programmable Read-Only Memory (EPROM), Electrically Erasable Programmable Read-Only Memory (EEPROM)) and flash memory devices; magnetic disks, such as internal hard disks and removable disks; magneto-optical disks; Random Access Memory (RAM); Solid State Drives (SSD); and CD-ROM and DVD-ROM disks. In some examples, machine-readable media may include non-transitory machine readable media. In some examples, machine-readable media may include machine-readable media that is not a transitory propagating signal.

The instructions 824 may further be transmitted or received over a communications network 826 using a transmission medium via the network interface device 820. The machine 800 may communicate with one or more other machines utilizing any one of a number of transfer protocols (e.g., frame relay, internet protocol (IP), transmission control protocol (TCP), user datagram protocol (UDP), hypertext transfer protocol (HTTP), etc.). Example communication networks may include a local area network (LAN), a wide area network (WAN), a packet data network (e.g., the Internet), mobile telephone networks (e.g., cellular networks), Plain Old Telephone (POTS) networks, and wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, a Long Term Evolution (LTE) family of standards, a Universal Mobile Telecommunications System (UMTS) family of standards, peer-to-peer (P2P) networks, among others. In an example, the network interface device 820 may include one or more physical jacks (e.g., Ethernet, coaxial, or phone jacks) or one or more antennas to connect to the communications network 826. In an example, the network interface device 820 may include a plurality of antennas to wirelessly communicate using at least one of single-input multiple-output (SIMO), multiple-input multiple-output (MIMO), or multiple-input single-output (MISO) techniques. In some examples, the network interface device 820 may wirelessly communicate using Multiple User MIMO techniques.

Examples, as described herein, may include, or may operate on, logic or a number of components, modules, or mechanisms (all referred to hereinafter as "modules"). Modules are tangible entities (e.g., hardware) capable of performing specified operations and may be configured or arranged in a certain manner. In an example, circuits may be arranged (e.g., internally or with respect to external entities such as other circuits) in a specified manner as a module. In an example, the whole or part of one or more computer systems (e.g., a standalone, client or server computer system) or one or more hardware processors may be configured by firmware or software (e.g., instructions, an application portion, or an application) as a module that operates to perform specified operations. In an example, the software may reside on a machine-readable medium. In an example, the software, when executed by the underlying hardware of the module, causes the hardware to perform the specified operations.

Accordingly, the term "module" is understood to encompass a tangible entity, be that an entity that is physically constructed, specifically configured (e.g., hardwired), or temporarily (e.g., transitorily) configured (e.g., programmed) to operate in a specified manner or to perform part or all of any operation described herein. Considering examples in which modules are temporarily configured, each of the modules need not be instantiated at any one moment in time. For example, where the modules comprise a general-purpose hardware processor configured using software, the general-purpose hardware processor may be configured as respective different modules at different times. Software may accordingly configure a hardware processor, for example, to constitute a particular module at one instance of time and to constitute a different module at a different instance of time.

The following numbered examples are illustrative embodiments.

1. A computer-implemented method, comprising: monitoring network communications between devices within a network; generating a time series of adjacency matrices corresponding to a time-dependent network graph representing the monitored network communications during a series of time intervals, nodes of the network graph representing the devices, and edges of the network graph each representing network communication between two of the devices during one of the time intervals, the series of time intervals comprising a plurality of first time intervals and a second time interval; computing, from the adjacency matrices associated with the first time intervals, a time series of spectral embeddings each comprising a plurality of spectral-embedding vectors associated with the nodes of the network graph; computing, from the time series of spectral embeddings, a predicted spectral embedding comprising a plurality of predicted spectral-embedding vectors associated with the nodes; computing, from pairs of the predicted spectral-embedding vectors, respective estimated probabilities of network communication between pairs of devices represented by respective pairs of nodes associated with the pairs of predicted spectral-embedding vectors; comparing the estimated probabilities against the adjacency matrix associated with the second time interval in accordance with an anomaly criterion that defines anomalous network behavior; identifying, based on the comparison, a subset of nodes associated with the anomalous network behavior; identifying, based on the subset of nodes, a subset of devices represented by the subset of nodes; and generating an output based on the identified subset of devices.

2. The method of example 1, wherein generating the output based on the identified subset of devices comprises reconfiguring an access control device of the network to restrict network communication of the identified subset of devices.

3. The method of example 2, wherein the access control device is a firewall.

4. The method of any of examples 1-3, wherein generating the output based on the identified subset of devices comprises at least one of enhancing communication logging, revoking or suspending a user account or notifying a user associated with communications originating from a device within the identified subset of devices.

5. The method of example 1, wherein the identified subset of devices experiences an anomalously high level of network communication, and wherein generating the output comprises allocating additional computational resources to the identified subset of devices.

6. The method of any of examples 1-5, wherein computing the predicted spectral embedding comprises aligning the spectral-embedding vectors across the time series of spectral embeddings, and computing the predicted spectral embedding vectors from the aligned spectral-embedding vectors.

7. The method of example 6, wherein the spectral-embedding vectors are aligned by generalized Procrustes alignment.

8. The method of example 6 or example 7, wherein computing the predicted spectral embedding vectors comprises averaging the aligned spectral-embedding vectors across the time series of spectral embeddings.

9. The method of example 6 or example 7, wherein the predicted spectral embedding vectors are computed with elementwise prediction models.

10. The method of example 9, wherein the elementwise prediction model is a seasonal autoregressive integrated moving average (SARIMA) model.

11. The method of any of examples 1-10, wherein each of the spectral embeddings in the time series of spectral embeddings is computed by adjacency spectral embedding.

12. The method of any of examples 1-10, wherein the network graph is directed, and wherein each of the spectral embeddings in the time series of spectral embeddings is computed by directed adjacency spectral embedding using singular value decomposition.

13. The method of any of examples 1-10, wherein each of the spectral embeddings in the time series of spectral embeddings is computed by Laplacian spectral embedding.

14. The method of any of examples 1-13, wherein the anomaly criterion is based on a threshold, and the identifying a subset of nodes associated with the anomalous network behavior comprises applying the threshold to the estimated probabilities of network communication.

15. The method of any of examples 1-13, further comprising determining a subgraph comprising the identified subset of nodes, wherein generating the output comprises outputting the subgraphs.

16. A system, comprising: hardware processing circuitry; one or more hardware memories storing instructions that when executed configure the hardware processing circuitry to perform operations comprising: generating a time series of adjacency matrices corresponding to a time-dependent network graph representing monitored network communications between devices within a network during a series of time intervals, nodes of the network graph representing the devices, and edges of the network graph each representing network communication between two of the devices during one of the time intervals, the series of time intervals comprising a plurality of first time intervals and a second time interval; computing, from the adjacency matrices associated with the first time intervals, a time series of spectral embeddings each comprising a plurality of spectral-embedding vectors associated with the nodes of the network graph; computing, from the time series of spectral embeddings, a predicted spectral embedding comprising a plurality of predicted spectral-embedding vectors associated with the nodes; computing, from pairs of the predicted spectral-embedding vectors, respective estimated probabilities of network communication between pairs of devices represented by respective pairs of nodes associated with the pairs of average spectral-embedding vectors; comparing the estimated probabilities against the adjacency matrix associated with the second time interval in accordance with an anomaly criterion that defines anomalous network behavior; identifying, based on the comparison, a subset of nodes associated with the anomalous network behavior; identifying, based on the subset of nodes, a subset of devices represented by the subset of nodes; and generating an output based on the identified subset of devices.

17. The system of example 16, wherein generating the output based on the identified subset of devices comprises reconfiguring an access control device of the network to restrict network communication of the identified subset of devices.

18. The system of example 17, wherein the access control device is a firewall.

19. The system of any of examples 16-18, wherein generating the output based on the identified subset of devices comprises at least one of enhancing communication logging, revoking or suspending a user account or notifying a user associated with communications originating from a device within the identified subset of devices.

20. The system of any of examples 16-18, wherein the identified subset of devices experiences an anomalously high level of network communication, and wherein generating the output comprises allocating additional computational resources to the identified subset of devices.

21. The system of any of examples 16-20, wherein computing the predicted spectral embedding comprises aligning the spectral-embedding vectors across the time series of spectral embeddings, and computing the predicted spectral-embedding vectors from the aligned spectral-embedding vectors.

22. The system of example 21, wherein the spectral-embedding vectors are aligned by generalized Procrustes alignment.

23. The system of example 21 or example 22, wherein computing the predicted spectral embedding vectors comprises averaging the aligned spectral-embedding vectors across the time series of spectral embeddings.

24. The method of example 21 or example 22, wherein the predicted spectral embedding vectors are computed with elementwise prediction models.

25. The system of example 24, wherein the elementwise prediction model is autoregressive integrated moving average (ARIMA) model or seasonal ARIMA (SARIMA) model.

26. The system of any of examples 16-25, wherein each of the spectral embeddings in the time series of spectral embeddings is computed by adjacency spectral embedding.

27. The system of any of examples 16-25, wherein the network graph is directed, and wherein each of the spectral embeddings in the time series of spectral embeddings is computed by directed adjacency spectral embedding using singular value decomposition.

28. The system of any of examples 16-25, wherein each of the spectral embeddings in the time series of spectral embeddings is computed by Laplacian spectral embedding.

29. The system of any of examples 16-25, wherein the anomaly criterion is based on a threshold, and the identifying a subset of nodes associated with the anomalous network behavior comprises applying the threshold to the estimated probabilities of network communication.

30. The system of any of examples 16-25, the operations further comprising determining a subgraph comprising the identified subset of nodes, wherein generating the output comprises outputting the subgraphs.

31. A non-transitory computer-readable storage medium comprising instructions that when executed configure hardware processing circuitry to perform operations comprising: generating a time series of adjacency matrices corresponding to a time-dependent network graph representing monitored network communications between devices within a network during a series of time intervals, nodes of the network graph representing the devices, and edges of the network graph each representing network communication between two of the devices during one of the time intervals, the series of time intervals comprising a plurality of first time intervals and a second time interval; computing, from the adjacency matrices associated with the first time intervals, a time series of spectral embeddings each comprising a plurality of spectral-embedding vectors associated with the nodes of the network graph; computing, from the time series of spectral embeddings, a predicted spectral embedding comprising a plurality of predicted spectral-embedding vectors associated with the nodes; computing, from pairs of the predicted spectral-embedding vectors, respective estimated probabilities of network communication between pairs of devices represented by respective pairs of nodes associated with the pairs of average spectral-embedding vectors; comparing the estimated probabilities against the adjacency matrix associated with the second time interval in accordance with an anomaly criterion that defines anomalous network behavior; identifying, based on the comparison, a subset of nodes associated with the anomalous network behavior; identifying, based on the subset of nodes, a subset of devices represented by the subset of nodes; and generating an output based on the identified subset of devices.

32. A computer-implemented method, comprising: monitoring network communications between devices within a network; generating a time series of adjacency matrices corresponding to a time-dependent network graph representing the monitored network communications during a plurality of time intervals, nodes of the network graph representing the devices, and edges of the network graph each representing network communication between two of the devices during one of the time intervals, the time intervals comprising a plurality of first time intervals and a second time interval; computing, from the adjacency matrices associated with first time intervals, a time series of weighting matrices; computing, based on the time series of weighting matrices, a weighted average of the adjacency matrices associated with the first time intervals; computing, from the weighted average, a plurality of spectral-embedding vectors each associated with one of the nodes of the network graph; computing, from pairs of the spectral-embedding vectors, respective estimated probabilities of network communication between a pair of devices represented by a pair of nodes associated with the respective pair of spectral-embedding vectors; comparing the estimated probabilities against the adjacency matrix associated with the second time interval in accordance with an anomaly criterion that defines anomalous network behavior; identifying, based on the comparison, a subset of nodes associated with the anomalous network behavior; identifying, based on the subset of nodes, a subset of devices represented by the subset of nodes; and generating an output based on the identified subset of devices.

33. The method of example 32, wherein the time series of weighting matrices is computed using an autoregressive integrated moving average (ARIMA) model or seasonal ARIMA (SARIMA) model.

34. The method of example 32 or example 33, wherein the spectral-embedding vectors are computed by adjacency spectral embedding.

35. The method of example 32 or example 33, wherein the network graph is directed, and wherein the spectral-embedding vectors are computed by directed adjacency spectral embedding using singular value decomposition.

36. The method of example 32 or example 33, wherein the spectral-embedding vectors are computed by Laplacian spectral embedding.

37. The method of any of examples 32-36, wherein the anomaly criterion is based on a threshold, and the determining of the portion of vertices representing anomalous network behavior comprises applying the threshold to the estimated probabilities of network communication.

38. The method of any of examples 32-36, further comprising determining a subgraph comprising the identified subset of nodes, wherein generating the output comprises outputting the subgraphs.

39. The method of any of examples 32-36, wherein generating the output based on the identified subset of devices comprises at least one of reconfiguring an access control device of the network to restrict network communication of the identified subset of devices, enhancing communication logging, revoking or suspending a user account or notifying a user associated with communications originating from a device within the identified subset of devices, or allocating additional computational resources to the identified subset of devices.

40. A system, comprising: hardware processing circuitry; one or more hardware memories storing instructions that when executed configure the hardware processing circuitry to perform operations comprising: generating a time series of adjacency matrices corresponding to a time-dependent network graph representing monitored network communications between devices within a network during a series of time intervals, nodes of the network graph representing the devices, and edges of the network graph each representing network communication between two of the devices during one of the time intervals, the series of time intervals comprising a plurality of first time intervals and a second time interval; computing, from the adjacency matrices associated with first time intervals, a time series of weighting matrices; computing, based on the time series of weighting matrices, a weighted average of the adjacency matrices associated with the first time intervals; computing, from the weighted average, a plurality of spectral-embedding vectors each associated with one of the nodes of the network graph; computing, from pairs of the spectral-embedding vectors, respective estimated probabilities of network communication between a pair of devices represented by a pair of nodes associated with the respective pair of spectral-embedding vectors; comparing the estimated probabilities against the adjacency matrix associated with the second time interval in accordance with an anomaly criterion that defines anomalous network behavior; identifying, based on the comparison, a subset of nodes associated with the anomalous network behavior; identifying, based on the subset of nodes, a subset of devices represented by the subset of nodes; and generating an output based on the identified subset of devices.

41. The system of example 40, wherein the time series of weighting matrices is computed using an autoregressive integrated moving average (ARIMA) model or seasonal ARIMA (SARIMA) model.

42. The system of example 40 or example 41, wherein the spectral-embedding vectors are computed by adjacency spectral embedding.

43. The system of example 40 or example 41, wherein the network graph is directed, and wherein the spectral-embedding vectors are computed by directed adjacency spectral embedding using singular value decomposition.

44. The system of example 40 or example 41, wherein the spectral-embedding vectors are computed by Laplacian spectral embedding.

45. The system of any of examples 40-44, wherein the anomaly criterion is based on a threshold, and the identifying a subset of nodes associated with the anomalous network behavior comprises applying the threshold to the estimated probabilities of network communication.

46. The system of any of examples 40-45, the operations further comprising determining a subgraph comprising the identified subset of nodes, wherein generating the output comprises outputting the subgraphs.

47. The system of any of examples 40-46, wherein generating the output based on the identified subset of devices comprises at least one of reconfiguring an access control device of the network to restrict network communication of the identified subset of devices, enhancing communication logging, revoking or suspending a user account or notifying a user associated with communications originating from a device within the identified subset of devices, or allocating additional computational resources to the identified subset of devices.

48. A non-transitory computer-readable storage medium comprising instructions that when executed configure hardware processing circuitry to perform operations comprising: generating a time series of adjacency matrices corresponding to a time-dependent network graph representing monitored network communications between devices within a network during a series of time intervals, nodes of the network graph representing the devices, and edges of the network graph each representing network communication between two of the devices during one of the time intervals, the series of time intervals comprising a plurality of first time intervals and a second time interval; computing, from the adjacency matrices associated with first time intervals, a time series of weighting matrices; computing, based on the time series of weighting matrices, a weighted average of the adjacency matrices associated with the first time intervals; computing, from the weighted average, a plurality of spectral-embedding vectors each associated with one of the nodes of the network graph; computing, from pairs of the spectral-embedding vectors, respective estimated probabilities of network communication between a pair of devices represented by a pair of nodes associated with the respective pair of spectral-embedding vectors; comparing the estimated probabilities against the adjacency matrix associated with the second time interval in accordance with an anomaly criterion that defines anomalous network behavior; identifying, based on the comparison, a subset of nodes associated with the anomalous network behavior; identifying, based on the subset of nodes, a subset of devices represented by the subset of nodes; and generating an output based on the identified subset of devices.

49. A computer-implemented method, comprising: monitoring network communications between devices within a network; generating a time series of adjacency matrices corresponding to a time-dependent network graph representing the monitored network communications during a plurality of time intervals, nodes of the network graph representing the devices, and edges of the network graph each representing network communication between two of the devices during one of the time intervals, the time intervals comprising a plurality of first time intervals and a second time interval; computing, from the adjacency matrices associated with the first time intervals, a time series of spectral embeddings each comprising a plurality of spectral-embedding vectors associated with the nodes of the network graph; computing, from the time series of spectral embeddings, a time series of respective link score matrices, entries of each link score matrix based on pairs of the spectral-embedding vectors of the respective spectral embedding; computing, from the time series of link score matrices, a time series of weighting matrices; computing, based on the time series of weighting matrices, a weighted average of the link score matrices, entries in the weighted average corresponding to estimated probabilities of network communication between pairs of devices represented by respective pairs of nodes; comparing the estimated probabilities against the adjacency matrix associated with the second time interval in accordance with an anomaly criterion that defines anomalous network behavior; identifying, based on the comparison, a subset of nodes associated with the anomalous network behavior; identifying, based on the subset of nodes, a subset of devices represented by the subset of nodes; and generating an output based on the identified subset of devices.

50. The method of example 49, wherein the time series of weighting matrices is computed using an autoregressive integrated moving average (ARIMA) model or seasonal ARIMA (SARIMA) model.

51. The method of example 49 or example 50, wherein the spectral embeddings are computed by adjacency spectral embedding.

52. The method of example 49 or example 50, wherein the network graph is directed, and wherein the spectral embeddings are computed by directed adjacency spectral embedding using singular value decomposition.

53. The method of example 49 or example 50, wherein the spectral embeddings are computed by Laplacian spectral embedding.

54. The method of any of examples 49-53, wherein the anomaly criterion is based on a threshold, and the identifying a subset of nodes associated with the anomalous network behavior comprises applying the threshold to the estimated probabilities of network communication.

55. The method of any of examples 49-54, further comprising determining a subgraph comprising the identified subset of nodes, wherein generating the output comprises outputting the subgraphs.

56. The method of any of examples 49-55, wherein generating the output based on the identified subset of devices comprises at least one of reconfiguring an access control device of the network to restrict network communication of the identified subset of devices, enhancing communication logging, revoking or suspending a user account or notifying a user associated with communications originating from a device within the identified subset of devices, or allocating additional computational resources to the identified subset of devices.

57. A system, comprising: hardware processing circuitry; one or more hardware memories storing instructions that when executed configure the hardware processing circuitry to perform operations comprising: generating a time series of adjacency matrices corresponding to a time-dependent network graph representing monitored network communications between devices within a network during a series of time intervals, nodes of the network graph representing the devices, and edges of the network graph each representing network communication between two of the devices during one of the time intervals, the series of time intervals comprising a plurality of first time intervals and a second time interval; computing, from the adjacency matrices associated with the first time intervals, a time series of spectral embeddings each comprising a plurality of spectral-embedding vectors associated with the nodes of the network graph; computing, from the time series of spectral embeddings, a time series of respective link score matrices, entries of each link score matrix based on pairs of the spectral-embedding vectors of the respective spectral embedding; computing, from the time series of link score matrices, a time series of weighting matrices; computing, based on the time series of weighting matrices, a weighted average of the link score matrices, entries in the weighted average corresponding to estimated probabilities of network communication between pairs of devices represented by respective pairs of nodes; comparing the estimated probabilities against the adjacency matrix associated with the second time interval in accordance with an anomaly criterion that defines anomalous network behavior; identifying, based on the comparison, a subset of nodes associated with the anomalous network behavior; identifying, based on the subset of nodes, a subset of devices represented by the subset of nodes; and generating an output based on the identified subset of devices.

58. The system of example 57, wherein the time series of weighting matrices is computed using an autoregressive integrated moving average (ARIMA) model or seasonal ARIMA (SARIMA) model.

59. The system of example 57 or example 58, wherein the spectral embeddings are computed by adjacency spectral embedding.

60. The system of example 57 or example 58, wherein the network graph is directed, and wherein the spectral embeddings are computed by directed adjacency spectral embedding using singular value decomposition.

61. The system of example 57 or example 58, wherein the spectral embeddings are computed by Laplacian spectral embedding.

62. The system of any of examples 57-61, wherein the anomaly criterion is based on a threshold, and the determining of the portion of vertices representing anomalous network behavior comprises applying the threshold to the estimated probabilities of network communication.

63. The system of any of examples 57-62, the operations further comprising determining a subgraph comprising the identified subset of nodes, wherein generating the output comprises outputting the subgraphs.

64. The system of any of examples 57-63, wherein generating the output based on the identified subset of devices comprises at least one of reconfiguring an access control device of the network to restrict network communication of the identified subset of devices, enhancing communication logging, revoking or suspending a user account or notifying a user associated with communications originating from a device within the identified subset of devices, or allocating additional computational resources to the identified subset of devices.

65. A non-transitory computer-readable storage medium comprising instructions that when executed configure hardware processing circuitry to perform operations comprising: generating a time series of adjacency matrices corresponding to a time-dependent network graph representing monitored network communications between devices within a network during a series of time intervals, nodes of the network graph representing the devices, and edges of the network graph each representing network communication between two of the devices during one of the time intervals, the series of time intervals comprising a plurality of first time intervals and a second time interval; computing, from the adjacency matrices associated with the first time intervals, a time series of spectral embeddings each comprising a plurality of spectral-embedding vectors associated with the nodes of the network graph; computing, from the time series of spectral embeddings, a time series of respective link score matrices, entries of each link score matrix based on pairs of the spectral-embedding vectors of the respective spectral embedding; computing, from the time series of link score matrices, a time series of weighting matrices; computing, based on the time series of weighting matrices, a weighted average of the link score matrices, entries in the weighted average corresponding to estimated probabilities of network communication between pairs of devices represented by respective pairs of nodes; comparing the estimated probabilities against the adjacency matrix associated with the second time interval in accordance with an anomaly criterion that defines anomalous network behavior; identifying, based on the comparison, a subset of nodes associated with the anomalous network behavior; identifying, based on the subset of nodes, a subset of devices represented by the subset of nodes; and generating an output based on the identified subset of devices.

66. A computer-implemented method, comprising: monitoring network communications between devices within a network; generating a time series of adjacency matrices corresponding to a time-dependent network graph representing the monitored network communications during a plurality of time intervals, nodes of the network graph representing the devices, and edges of the network graph each representing network communication between two of the devices during one of the time intervals, the time intervals comprising a plurality of first time intervals and a second time interval; computing by multiple adjacency spectral embedding, from the adjacency matrices associated with the first time intervals, a plurality of spectral-embedding vectors associated with the nodes of the network graph and a time series of COSIE correction matrices; computing, from the time series of COSIE correction matrices, a predicted COSIE correction matrix, each element of the predicted COSIE correction matrix based on an independent model of respective elements of the time series of COSIE correction matrices; computing, from pairs of the spectral-embedding vectors in conjunction with the predicted COSIE matrix, estimated probabilities of network communication between respective pairs of devices represented by pairs of nodes associated with the respective pairs of spectral-embedding vectors; comparing the estimated probabilities against the adjacency matrix associated with the second time interval in accordance with an anomaly criterion that defines anomalous network behavior; identifying, based on the comparison, a subset of nodes associated with the anomalous network behavior; identifying, based on the subset of nodes, a subset of devices represented by the subset of nodes; and generating an output based on the identified subset of devices.

67. The method of example 66, wherein the predicted COSIE correction matrix is computed using an autoregressive integrated moving average (ARIMA) model or seasonal ARIMA (SARIMA) model.

68. The method of example 66 or example 67, wherein the spectral-embedding vectors are computed by adjacency spectral embedding.

69. The method of example 66 or example 67, wherein the network graph is directed, and wherein the spectral-embedding vectors are computed by directed adjacency spectral embedding using singular value decomposition.

70. The method of example 66 or example 67, wherein the spectral-embedding vectors are computed by Laplacian spectral embedding.

71. The method of any of examples 66-70, wherein the anomaly criterion is based on a threshold, and the identifying a subset of nodes associated with the anomalous network behavior comprises applying the threshold to the estimated probabilities of network communication.

72. The method of any of examples 66-71, further comprising, determining a subgraph comprising the identified subset of nodes, wherein generating the output comprises outputting the subgraphs.

73. The method of any of examples 66-72, wherein generating the output based on the identified subset of devices comprises at least one of reconfiguring an access control device of the network to restrict network communication of the identified subset of devices, enhancing communication logging, revoking or suspending a user account or notifying a user associated with communications originating from a device within the identified subset of devices, or allocating additional computational resources to the identified subset of devices.

74. A system, comprising: hardware processing circuitry; one or more hardware memories storing instructions that when executed configure the hardware processing circuitry to perform operations comprising: generating a time series of adjacency matrices corresponding to a time-dependent network graph representing monitored network communications between devices within a network during a series of time intervals, nodes of the network graph representing the devices, and edges of the network graph each representing network communication between two of the devices during one of the time intervals, the series of time intervals comprising a plurality of first time intervals and a second time interval; computing by multiple adjacency spectral embedding, from the adjacency matrices associated with the first time intervals, a plurality of spectral-embedding vectors associated with the nodes of the network graph and a time series of COSIE correction matrices; computing, from the time series of COSIE correction matrices, a predicted COSIE correction matrix, each element of the predicted COSIE correction matrix based on an independent model of respective elements of the time series of COSIE correction matrices; computing, from pairs of the spectral-embedding vectors in conjunction with the predicted COSIE matrix, estimated probabilities of network communication between respective pairs of devices represented by pairs of nodes associated with the respective pairs of spectral-embedding vectors; comparing the estimated probabilities against the adjacency matrix associated with the second time interval in accordance with an anomaly criterion that defines anomalous network behavior; identifying, based on the comparison, a subset of nodes associated with the anomalous network behavior; identifying, based on the subset of nodes, a subset of devices represented by the subset of nodes; and generating an output based on the identified subset of devices.

75. The system of example 74, wherein the time series of COSIE correction matrices is computed using an autoregressive integrated moving average (ARIMA) model or seasonal ARIMA (SARIMA) model.

76. The system of example 74 or example 75, wherein the spectral embeddings are computed by adjacency spectral embedding.

77. The system of example 74 or example 75, wherein the network graph is directed, and wherein the spectral embeddings are computed by directed adjacency spectral embedding using singular value decomposition.

78. The system of example 74 or example 75, wherein the spectral embeddings are computed by Laplacian spectral embedding.

79. The system of any of examples 74-78, wherein the anomaly criterion is based on a threshold, and the determining of the portion of vertices representing anomalous network behavior comprises applying the threshold to the estimated probabilities of network communication.

80. The system of any of examples 74-79, the operations further comprising, determining a subgraph comprising the identified subset of nodes, wherein generating the output comprises outputting the subgraphs.

81. The system of any of examples 74-80, wherein generating the output based on the identified subset of devices comprises at least one of reconfiguring an access control device of the network to restrict network communication of the identified subset of devices, enhancing communication logging, revoking or suspending a user account or notifying a user associated with communications originating from a device within the identified subset of devices, or allocating additional computational resources to the identified subset of devices.

82. A non-transitory computer-readable storage medium comprising instructions that when executed configure hardware processing circuitry to perform operations comprising: generating a time series of adjacency matrices corresponding to a time-dependent network graph representing monitored network communications between devices within a network during a series of time intervals, nodes of the network graph representing the devices, and edges of the network graph each representing network communication between two of the devices during one of the time intervals, the series of time intervals comprising a plurality of first time intervals and a second time interval; computing by multiple adjacency spectral embedding, from the adjacency matrices associated with the first time intervals, a plurality of spectral-embedding vectors associated with the nodes of the network graph and a time series of COSIE correction matrices; computing, from the time series of COSIE correction matrices, a predicted COSIE correction matrix, each element of the predicted COSIE correction matrix based on an independent model of respective elements of the time series of COSIE correction matrices; computing, from pairs of the spectral-embedding vectors in conjunction with the predicted COSIE matrix, estimated probabilities of network communication between respective pairs of devices represented by pairs of nodes associated with the respective pairs of spectral-embedding vectors; comparing the estimated probabilities against the adjacency matrix associated with the second time interval in accordance with an anomaly criterion that defines anomalous network behavior; identifying, based on the comparison, a subset of nodes associated with the anomalous network behavior; identifying, based on the subset of nodes, a subset of devices represented by the subset of nodes; and generating an output based on the identified subset of devices.

Although embodiments have been described with reference to specific example embodiments, it will be evident that various modifications and changes may be made to these embodiments without departing from the broader scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be used and derived therefrom, such that structural and logical substitutions and changes may be made without departing from the scope of this disclosure. This description, therefore, is not to be taken in a limiting sense, and the scope of various embodiments is defined only by the appended claims, along with the full range of equivalents to which such claims are entitled.

We claim:

1. A computer-implemented method, comprising:
monitoring network communications between devices within a network;
generating a time series of adjacency matrices corresponding to a time-dependent network graph representing the monitored network communications during a series of time intervals, nodes of the network graph representing the devices, and edges of the network graph each representing network communication between two of the devices during one of the time intervals, the series of time intervals comprising a plurality of first time intervals and a second time interval;
computing, from spectral decompositions based on eigenvalues and eigenvectors of the adjacency matrices associated with the first time intervals or of matrices derived from the adjacency matrices, a time series of spectral embeddings each comprising a plurality of spectral-embedding vectors associated with the nodes of the network graph;
computing, from the time series of spectral embeddings, a predicted spectral embedding comprising a plurality of predicted spectral-embedding vectors associated with the nodes;
computing, from pairs of the predicted spectral-embedding vectors, respective estimated probabilities of network communication between pairs of devices represented by respective pairs of nodes associated with the pairs of predicted spectral-embedding vectors;
comparing the estimated probabilities against the adjacency matrix associated with the second time interval in accordance with an anomaly criterion that defines anomalous network behavior;
identifying, based on the comparison, a subset of nodes associated with the anomalous network behavior;
identifying, based on the subset of nodes, a subset of devices represented by the subset of nodes; and
generating an output based on the identified subset of devices.

2. The method of claim 1, wherein generating the output based on the identified subset of devices comprises reconfiguring an access control device of the network to restrict network communication of the identified subset of devices.

3. The method of claim 2, wherein the access control device is a firewall.

4. The method of claim 1, wherein generating the output based on the identified subset of devices comprises at least one of enhancing communication logging, revoking or suspending a user account or notifying a user associated with communications originating from a device within the identified subset of devices.

5. The method of claim 1, wherein the identified subset of devices experiences an anomalously high level of network communication, and wherein generating the output comprises allocating additional computational resources to the identified subset of devices.

6. The method of claim 1, wherein computing the predicted spectral embedding comprises aligning the spectral-embedding vectors across the time series of spectral embeddings, and computing the predicted spectral embedding vectors from the aligned spectral-embedding vectors.

7. The method of claim 6, wherein the spectral-embedding vectors are aligned by generalized Procrustes alignment.

8. The method of claim 6, wherein computing the predicted spectral embedding vectors comprises averaging the aligned spectral-embedding vectors across the time series of spectral embeddings.

9. The method of claim 6, wherein the predicted spectral embedding vectors are computed with elementwise prediction models.

10. The method of claim 9, wherein the elementwise prediction model is a seasonal autoregressive integrated moving average (SARIMA) model.

11. The method of claim 1, wherein each of the spectral embeddings in the time series of spectral embeddings is computed by adjacency spectral embedding.

12. The method of claim 1, wherein the network graph is directed, and wherein each of the spectral embeddings in the time series of spectral embeddings is computed by directed adjacency spectral embedding using singular value decomposition.

13. The method of claim 1, wherein each of the spectral embeddings in the time series of spectral embeddings is computed by Laplacian spectral embedding.

14. The method of claim 1, wherein the anomaly criterion is based on a threshold, and the identifying a subset of nodes associated with the anomalous network behavior comprises applying the threshold to the estimated probabilities of network communication.

15. The method of claim 1, further comprising determining a subgraph comprising the identified subset of nodes, wherein generating the output comprises outputting the subgraphs.

16. A system, comprising:
hardware processing circuitry;
one or more hardware memories storing instructions that when executed configure the hardware processing circuitry to perform operations comprising:
generating a time series of adjacency matrices corresponding to a time-dependent network graph representing monitored network communications between devices within a network during a series of time intervals, nodes of the network graph representing the devices, and edges of the network graph each representing network communication between two of the devices during one of the time intervals, the series of time intervals comprising a plurality of first time intervals and a second time interval;
computing, from spectral decompositions based on eigenvalues and eigenvectors of the adjacency matrices associated with the first time intervals or of matrices derived from the adjacency matrices, a time series of spectral einbeddings each comprising a plurality of spectral-embedding vectors associated with the nodes of the network graph;
computing, from the time series of spectral embeddings, a predicted spectral embedding comprising a plurality of predicted spectral-embedding vectors associated with the nodes;
computing, from pairs of the predicted spectral-embedding vectors, respective estimated probabilities of network communication between pairs of devices represented by respective pairs of nodes associated with the pairs of average spectral-embedding vectors;
comparing the estimated probabilities against the adjacency matrix associated with the second time interval in accordance with an anomaly criterion that defines anomalous network behavior;
identifying, based on the comparison, a subset of nodes associated with the anomalous network behavior;
identifying, based on the subset of nodes, a subset of devices represented by the subset of nodes; and
generating an output based on the identified subset of devices.

17. The system of claim 16, wherein computing the predicted spectral embedding comprises aligning the spectral-embedding vectors across the time series of spectral embeddings, and computing the predicted spectral-embedding vectors from the aligned spectral-embedding vectors.

18. The system of claim 17, wherein computing the predicted spectral embedding vectors comprises averaging the aligned spectral-embedding vectors across the time series of spectral embeddings.

19. The method of claim 17, wherein the predicted spectral embedding vectors are computed with elementwise prediction models.

20. A non-transitory computer-readable storage medium comprising instructions that when executed configure hardware processing circuitry to perform operations comprising:
generating a time series of adjacency matrices corresponding to a time-dependent network graph representing monitored network communications between devices within a network during a series of time intervals, nodes of the network graph representing the devices, and edges of the network graph each representing network communication between two of the devices during one of the time intervals, the series of time intervals comprising a plurality of first time intervals and a second time interval;
computing, from spectral decompositions based on eigenvalues and eigenvectors of the adjacency matrices associated with the first time intervals or of matrices derived from the adjacency matrices, a time series of spectral embeddings each comprising a plurality of spectral-embedding vectors associated with the nodes of the network graph;
computing, from the time series of spectral embeddings, a predicted spectral embedding comprising a plurality of predicted spectral-embedding vectors associated with the nodes;
computing, from pairs of the predicted spectral-embedding vectors, respective estimated probabilities of network communication between pairs of devices represented by respective pairs of nodes associated with the pairs of average spectral-embedding vectors;
comparing the estimated probabilities against the adjacency matrix associated with the second time interval in accordance with an anomaly criterion that defines anomalous network behavior;
identifying, based on the comparison, a subset of nodes associated with the anomalous network behavior;
identifying, based on the subset of nodes, a subset of devices represented by the subset of nodes; and
generating an output based on the identified subset of devices.

* * * * *